(12) United States Patent
McKee et al.

(10) Patent No.: US 11,149,383 B2
(45) Date of Patent: *Oct. 19, 2021

(54) LAYERED FIBROUS STRUCTURES

(71) Applicant: The Procter & Gamble Company, Cincinnati, OH (US)

(72) Inventors: Matthew Gary McKee, Cincinnati, OH (US); Christopher Scott Kraus, Sunman, IN (US); David William Cabell, Hamilton, OH (US); Paul Dennis Trokhan, Hamilton, OH (US); Benjamin J. Popham, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/875,009

(22) Filed: Jan. 19, 2018

(65) Prior Publication Data

US 2018/0209100 A1    Jul. 26, 2018

Related U.S. Application Data

(60) Provisional application No. 62/540,106, filed on Aug. 2, 2017, provisional application No. 62/448,541, filed on Jan. 20, 2017.

(51) Int. Cl.
*D21H 27/38*    (2006.01)
*B32B 5/26*    (2006.01)
(Continued)

(52) U.S. Cl.
CPC ............... *D21H 27/38* (2013.01); *B32B 5/12* (2013.01); *B32B 5/26* (2013.01); *D21H 27/005* (2013.01);
(Continued)

(58) Field of Classification Search
CPC .... D21H 27/002; D21H 27/005; D21H 27/30; D21H 27/38; D21H 15/06; B32B 5/26;
(Continued)

(56) References Cited

U.S. PATENT DOCUMENTS 4,501,640 A    2/1985    Soerens
4,528,316 A    7/1985    Soerens
(Continued)

FOREIGN PATENT DOCUMENTS

ES            1075636        11/2011
KR       101443872 B1        9/2014
WO      WO 2002/95131        11/2002

OTHER PUBLICATIONS

U.S. Appl. No. 15/875,036, filed Jan. 19, 2018, David William Cabell, et al.
(Continued)

*Primary Examiner* — Jose A Fortuna
(74) *Attorney, Agent, or Firm* — C. Brant Cook

(57) ABSTRACT

Layered fibrous structures, and more particularly layered fibrous structures containing two or more layers of fibrous elements, for example filaments, that exhibit different physical characteristics, such as different Elongation at Rupture values as measured according to the Elongation at Rupture Test Method described herein, and/or pilling, and/or dry lint scores, sanitary tissue products comprising such layered fibrous structures, and methods for making same.

18 Claims, 10 Drawing Sheets

(51) Int. Cl.
  *B32B 5/12* (2006.01)
  *D21H 27/00* (2006.01)
(52) U.S. Cl.
  CPC ... *B32B 2250/20* (2013.01); *B32B 2262/0223* (2013.01); *B32B 2262/062* (2013.01); *B32B 2307/50* (2013.01); *B32B 2555/00* (2013.01)
(58) Field of Classification Search
  CPC ...... B32B 2262/0223; B32B 2262/062; B32B 2555/00; B32B 5/12; B32B 2250/20; B32B 2307/50; B32B 5/022; B32B 2307/54; B32B 5/08; C08F 220/20; D04H 1/425; A47K 10/16; D01F 2/00; D01F 2/24; D01F 6/14; D01F 9/00; Y10T 428/24612; Y10T 442/608
  See application file for complete search history.

(56) References Cited

U.S. PATENT DOCUMENTS

| | | | |
|---|---|---|---|
| 6,461,476 B1 | 10/2002 | Goulet et al. | |
| 7,785,443 B2 | 8/2010 | Hermans et al. | |
| 8,082,791 B2 | 12/2011 | Gruener | |
| 8,216,427 B2 | 7/2012 | Klerelid et al. | |
| 8,252,142 B2 | 8/2012 | Gane et al. | |
| 8,262,857 B2 | 9/2012 | Hermans et al. | |
| 8,366,878 B2 | 2/2013 | Klerelid et al. | |
| 8,426,301 B2 | 4/2013 | Oh et al. | |
| 8,834,679 B2 | 9/2014 | Kim et al. | |
| 8,968,517 B2 | 3/2015 | Ramaratnam et al. | |
| 9,127,408 B2 | 9/2015 | Qin et al. | |
| 9,243,367 B2 | 1/2016 | Rekoske et al. | |
| 9,283,730 B2 | 3/2016 | Zwick et al. | |
| 10,060,052 B2 * | 8/2018 | McKee | D21H 17/28 |
| 10,155,358 B2 * | 12/2018 | Heinzman | B32B 5/028 |
| 2003/0211800 A1 | 11/2003 | Duncan et al. | |
| 2006/0027349 A1 | 3/2006 | Nielsen | |
| 2008/0023873 A1 | 1/2008 | Mankad et al. | |
| 2009/0022960 A1 * | 1/2009 | Suer | A47K 10/16 428/194 |
| 2009/0023839 A1 * | 1/2009 | Barnholtz | D01D 5/0985 523/222 |
| 2009/0025894 A1 * | 1/2009 | Barnholtz | D21H 27/002 162/141 |
| 2009/0056892 A1 | 5/2009 | Volanthen et al. | |
| 2009/0100916 A1 | 8/2009 | Evaristo et al. | |
| 2010/0159200 A1 | 6/2010 | Soerens et al. | |
| 2010/0249741 A1 * | 9/2010 | Fingal | D04H 5/03 604/385.01 |
| 2010/0258258 A1 | 10/2010 | Gane et al. | |
| 2011/0039054 A1 | 2/2011 | Cabell et al. | |
| 2011/0104444 A1 | 5/2011 | Barnholtz et al. | |
| 2011/0180223 A1 | 7/2011 | Klerelid et al. | |
| 2012/0031576 A1 | 2/2012 | Gane et al. | |
| 2013/0216789 A1 * | 8/2013 | Kraus | D21H 27/30 428/172 |
| 2013/0216809 A1 * | 8/2013 | Cabell | D04H 1/425 428/219 |
| 2013/0280503 A1 * | 10/2013 | Cabell | D21H 17/28 428/196 |
| 2013/0280508 A1 * | 10/2013 | Heinzman | C08L 3/02 428/219 |
| 2013/0280979 A1 * | 10/2013 | McKee | D01F 2/00 442/392 |
| 2013/0302566 A1 | 11/2013 | Barnholtz et al. | |
| 2014/0050890 A1 | 2/2014 | Zwick et al. | |
| 2014/0096924 A1 | 4/2014 | Rekoske et al. | |
| 2014/0178660 A1 | 6/2014 | Kim et al. | |
| 2015/0114580 A1 * | 4/2015 | McKee | D21H 17/28 162/123 |
| 2015/0225903 A1 | 8/2015 | Jeannot et al. | |
| 2016/0040337 A1 * | 2/2016 | Dutkiewicz | B32B 38/164 428/172 |
| 2016/0097163 A1 | 4/2016 | Rekoske et al. | |
| 2017/0007079 A1 * | 1/2017 | O'Brien Stickney | A47K 10/16 |
| 2017/0009401 A1 * | 1/2017 | O'Brien Stickney | D21H 27/005 |
| 2017/0282487 A1 * | 10/2017 | Cabell | B32B 5/022 |
| 2017/0282520 A1 * | 10/2017 | Cabell | B32B 5/08 |
| 2017/0282521 A1 * | 10/2017 | Cabell | B32B 5/08 |
| 2017/0282522 A1 * | 10/2017 | Cabell | B32B 5/08 |
| 2017/0282523 A1 * | 10/2017 | Cabell | A61F 13/53 |
| 2017/0282524 A1 * | 10/2017 | Cabell | D21H 27/002 |
| 2017/0284025 A1 * | 10/2017 | Cabell | D21H 27/004 |
| 2018/0002848 A1 * | 1/2018 | Burt | B32B 5/022 |
| 2018/0209100 A1 * | 7/2018 | McKee | D21H 27/38 |
| 2018/0209101 A1 * | 7/2018 | Cabell | D21H 27/30 |
| 2019/0136458 A1 * | 5/2019 | Barnholtz | D21H 27/002 |
| 2019/0242066 A1 * | 8/2019 | Barnholtz | D04H 1/407 |
| 2019/0366676 A1 * | 12/2019 | Kleinwaechter | B32B 5/26 |
| 2019/0366677 A1 * | 12/2019 | Kleinwaechter | B32B 5/028 |
| 2020/0102671 A1 * | 4/2020 | Barnholtz | D04H 3/16 |
| 2020/0399803 A1 * | 12/2020 | Cabell | D04H 1/425 |
| 2021/0001597 A1 * | 1/2021 | Kleinwaechter | B32B 3/263 |
| 2021/0001598 A1 * | 1/2021 | Kleinwaechter | B32B 3/30 |
| 2021/0123188 A1 * | 4/2021 | McKee | D21H 19/34 |
| 2021/0123190 A1 * | 4/2021 | McKee | D21H 27/02 |

OTHER PUBLICATIONS

U.S. Appl. No. 15/202,799, filed Jul. 16, 2016, Janes Christine O'Brien Stickney, et al.
U.S. Appl. No. 15/202,805, filed Jul. 15, 2016, Janes Christine O'Brien Stickney, et al.
PCT International Search Report dated Sep. 26, 2016—6 pages.
PCT International Search Report dated Oct. 12, 2016—6 pages.
All Office Actions U.S. Appl. No. 15/202,799; U.S. Appl. No. 15/202,805 and U.S. Appl. No. 15/875,036.

* cited by examiner

Unacceptable pilling (examples 1 and 4)

Acceptable pilling (examples 2 and 3)

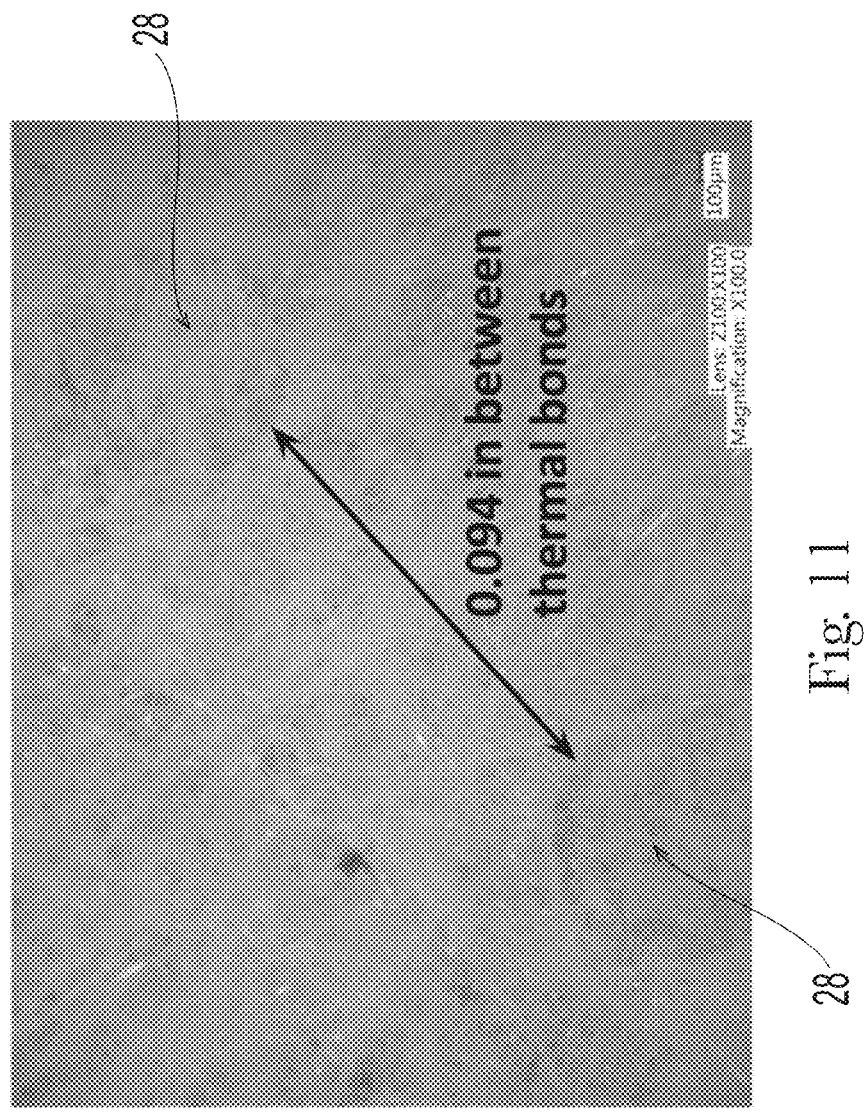

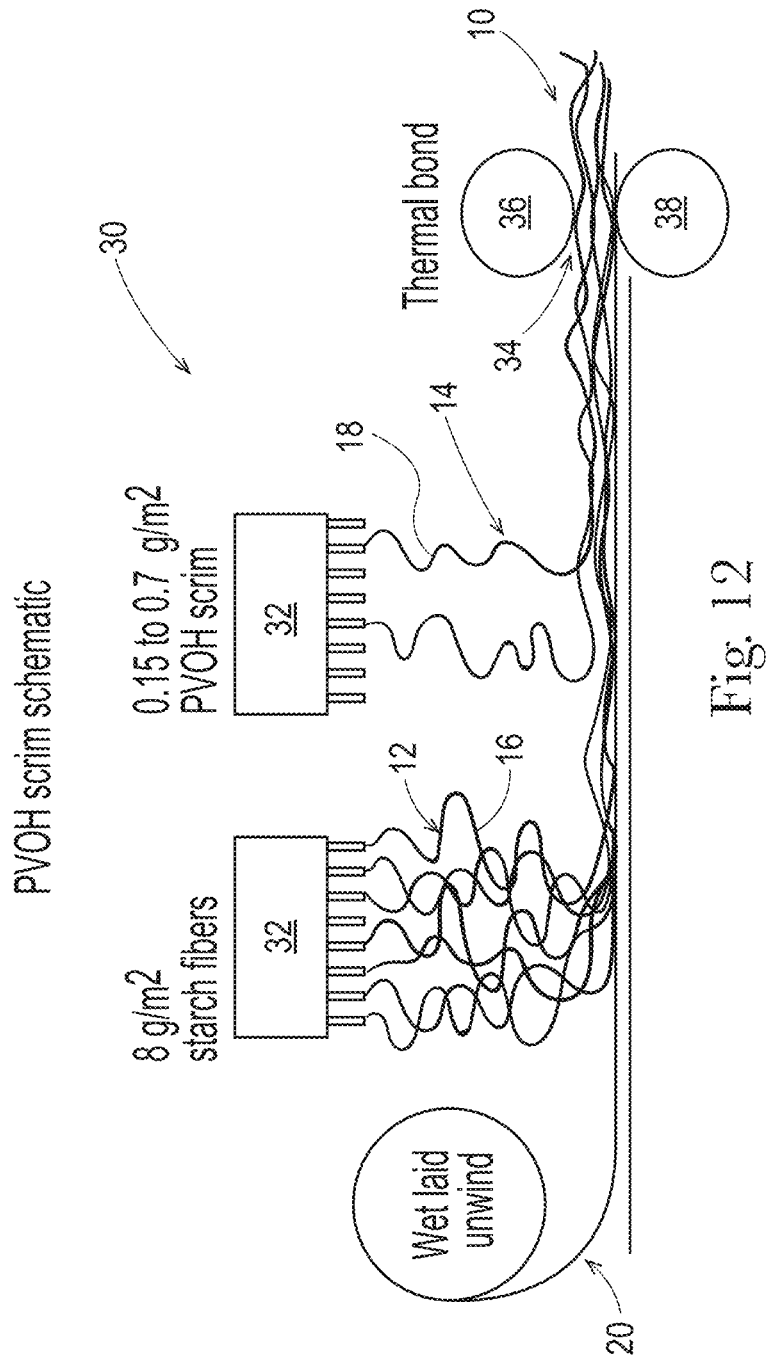

LAYERED FIBROUS STRUCTURES

FIELD OF THE INVENTION

The present invention relates to layered fibrous structures, and more particularly to layered fibrous structures comprising two or more layers of fibrous elements, for example filaments, that exhibit different physical characteristics, such as different Elongation at Rupture values as measured according to the Elongation at Rupture Test Method described herein, and/or pilling and/or dry lint scores, sanitary tissue products comprising such layered fibrous structures, and methods for making same.

BACKGROUND OF THE INVENTION

Surface properties of fibrous structures, especially consumer fibrous structures, such as sanitary tissue products, for example toilet tissue, are very important to consumers of such fibrous structures.

If a fibrous structure's surface properties are considered too rough such that it doesn't glide on the skin sufficiently to keep from irritating the skin, then the fibrous structure exhibits consumer negatives for certain consumers of fibrous structures. An example of such a known fibrous structure is a commercially available cellulose pulp fiber-based, wet laid fibrous structure (web material), for example a very coarse, uncreped, through-air-dried wet laid fibrous structure.

Formulators have attempted to overcome the consumer negatives of such rough fibrous structures, such as rough sanitary tissue products, by depositing surface chemistries, such as softening agents, for example silicones and/or making fibrous structures, for example sanitary tissue products, such as bath tissue, out of starch and/or starch derivative fibrous elements, such as starch filaments, especially when the starch filaments form an exterior surface, a consumer-contacting surface, of the fibrous structure. The presence of starch filaments on an exterior surface of a fibrous structure, for example when the starch filaments form an exterior layer that exhibits a basis weight of greater than 2 and/or greater than 5 and/or greater than 10 and/or greater than 15 gsm provides superior feel and glide on skin. However, one problem formulators have faced with fibrous structures having such an exterior layer containing starch filaments is that the fibrous structures exhibit unacceptable pilling during use by a user. This problem with the starch filaments pilling is exasperated when the starch filaments are present on a surface of a pulp-containing web material, such as a wet-laid fibrous structure, in the form of an exterior, consumer-contacting surface. This unacceptable pilling and/or linting is shown in Prior Art FIGS. 1A and 1B compared to acceptable pilling and/or linting as shown in FIGS. 2A and 2B as measured according to the Lint Test Method described herein.

Accordingly, one problem that has not been addressed to date is achieving superior or at least consumer acceptable feel and/or glide on skin utilizing filaments, such as hydroxyl polymer filaments, for example starch filaments, as an exterior, consumer-contacting layer on a fibrous structure, such as a sanitary tissue product, for example toilet tissue, without unacceptably pilling and/or linting during use as measured according to the Lint Test Method described herein.

Accordingly, there is a need for a fibrous structure that comprises an exterior layer (consumer-contacting layer) comprising filaments, such as hydroxyl polymer filaments, for example starch filaments that provides superior or at least consumer acceptable feel and/or glide on skin without exhibiting unacceptable pilling and/or linting, sanitary tissue products comprising such a fibrous structure, and a method for making such a fibrous structure.

SUMMARY OF THE INVENTION

The present invention fulfills the needs described above by providing a layered fibrous structure comprising an exterior layer, for example a consumer-contacting layer, comprising a material, for example a plurality of hydroxyl polymer filaments, such as starch filaments, that exhibits consumer acceptable pilling and/or linting during use as measured according to the Lint Test Method described herein.

One solution to the problem identified above is to provide a layered fibrous structure comprising a first layer comprising a plurality of first filaments comprising a first hydroxyl polymer, for example a polysaccharide, such as starch, and a second layer comprising a plurality of second filaments comprising a second hydroxyl polymer chemically different from the first hydroxyl polymer, for example a non-polysaccharide, such as polyvinyl alcohol (crosslinked or uncrosslinked) and/or a hydroxyl polymer that has a solubility parameter of between 18.8 $MPa^{1/2}$ and 25.6 $MPa^{1/2}$, wherein the first layer and second layer are associated with one another such that the layered fibrous structure exhibits superior and/or at least consumer acceptable feel and/or glide on skin without exhibiting consumer unacceptable pilling during use.

In one example of the present invention, a layered fibrous structure comprising:
  a. a first layer comprising a plurality of first filaments, for example first filaments comprising a first hydroxyl polymer, such as starch and/or starch derivatives; and
  b. a second layer comprising a plurality of second filaments chemically different from the first hydroxyl polymer, is provided.

In another example of the present invention, a layered fibrous structure comprising:
  a. a first layer comprising a plurality of first filaments, for example first filaments comprising a first hydroxyl polymer, such as starch and/or starch derivatives; and
  b. a second layer comprising a plurality of second filaments comprising a polymer that exhibits a solubility of greater than 16.0 $MPa^{1/2}$ and/or greater than 17.0 $MPa^{1/2}$ and/or greater than 18.0 $MPa^{1/2}$ and/or greater than 18.8 $MPa^{1/2}$ and/or greater than 20.0 $MPa^{1/2}$ and/or less than 25.6 $MPa^{1/2}$ and/or less than 24.0 $MPa^{1/2}$ and/or less than 23.0 $MPa^{1/2}$, is provided.

In still another example of the present invention, a layered fibrous structure that exhibits a Dry Lint Score of greater than 2.3 and less than 4.0 and/or greater than 2.5 to less than 4.0 and/or greater than 2.75 to less than 4.0 and/or at least 3.0 to less than 4.0 and/or greater than 3.0 to less than 4.0 as measured according to the Lint Test Method described herein and a Force to Drag Value of less than 80 and/or less than 75 and/or less than 70 and/or less than 65 and/or less than 60 and/or less than 55 as measured according to the Glide on Skin Test Method described herein, is provided.

In still another example of the present invention, a layered fibrous structure that exhibits a Dry Lint Score of greater than 2.3 and less than 4.0 and/or greater than 2.5 to less than 4.0 and/or greater than 2.75 to less than 4.0 and/or at least 3.0 to less than 4.0 and/or greater than 3.0 to less than 4.0 as measured according to the Lint Test Method described herein and a Force Variability Value of less than 1.60 and/or less than 1.55 and/or less than 1.50 and/or less than 1.45 and/or less than 1.40 and/or less than 1.35 and/or less than 1.30 and/or less than 1.25 and/or less than 1.20 and/or less than 1.15 and/or less than 1.10 and/or less than 1.05 and/or less than 1.00 and/or less than 0.95 and/or less than 0.90 as measure according to the Glide on Skin Test Method described herein, is provided.

In even still another example of the present invention, a layered fibrous structure that exhibits a Dry Lint Score of greater than 0 and/or greater than 0.5 and/or greater than 1.0 and/or greater than 1.5 and/or greater than 2.0 and/or greater than 2.3 and/or less than 8.0 and/or less than 7.0 and/or less than 6.0 and/or less than 5.0 and/or less than 4.5 and/or less than 4.0 and/or from about 0 to about 6.0 and/or from about 0.5 to about 5.0 and/or from about 1.0 to about 5.0 and/or from about 1.5 to about 5.0 and/or from about 2.0 to about 4.5 and/or greater than 2.3 to less than 4.0 and/or greater than 2.5 to less than 4.0 and/or greater than 2.75 to less than 4.0 and/or at least 3.0 to less than 4.0 and/or greater than 3.0 to less than 4.0 as measured according to the Lint Test Method described herein and a Force Variability Value of less than 1.20 and/or less than 1.15 and/or less than 1.10 and/or less than 1.05 and/or less than 1.00 and/or less than 0.95 and/or less than 0.90 as measure according to the Glide on Skin Test Method described herein, is provided.

The present invention provides a layered fibrous structure that exhibits improved surface properties, such as feel and/or glide on skin, compared to known fibrous structures without exhibiting unacceptable pilling during use, methods for making same, and sanitary tissue products comprising such layered fibrous structures.

BRIEF DESCRIPTION OF THE DRAWINGS

FIG. 11 is a magnified image of a top view of an example of a layered fibrous structure according to the present invention;

FIG. 12 is a schematic representation of a process for making an example of a layered fibrous structure according to the present invention;

DETAILED DESCRIPTION OF THE INVENTION

Definitions

Figures 1A, 1B, 2A, 2B:
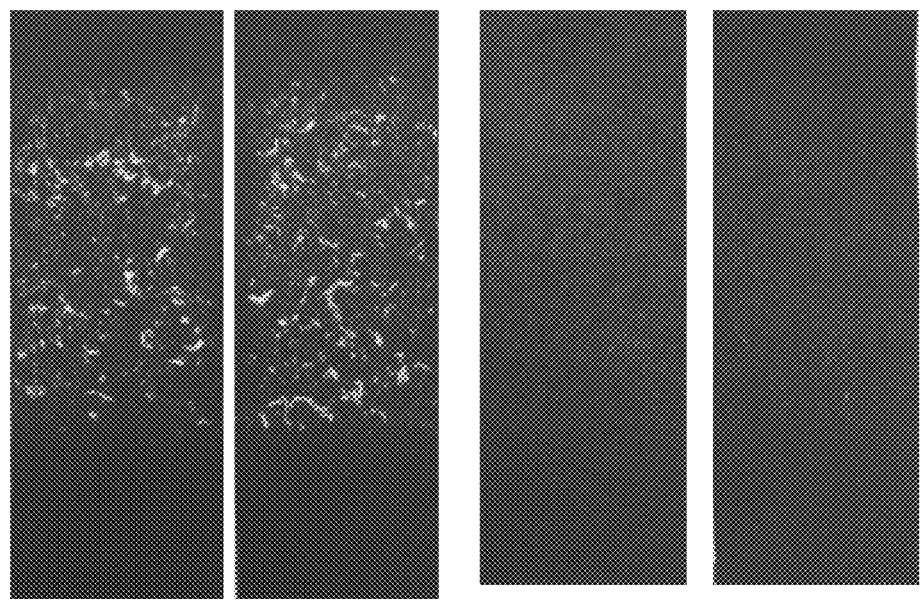
FIG. 1A is an image illustrating unacceptable pilling during use of an example of a prior art fibrous structure comprising an exterior, consumer-contacting layer of starch filaments.
FIG. 1B is an image illustrating unacceptable pilling during use of another example of a prior art fibrous structure comprising an exterior, consumer-contacting layer of starch filaments.
FIG. 2A is an image illustrating acceptable pilling during use of an example of a fibrous structure according to the present invention.
FIG. 2B is an image illustrating acceptable pilling during use of another example of a fibrous structure according to the present invention.

"Fibrous element" as used herein means an elongate particulate having a length greatly exceeding its average diameter, i.e. a length to average diameter ratio of at least about 10. A fibrous element may be a filament or a fiber. In one example, the fibrous element is a single fibrous element rather than a yarn comprising a plurality of fibrous elements.

The fibrous elements of the present invention may be spun from polymer melt compositions via suitable spinning operations, such as meltblowing and/or spunbonding and/or they may be obtained from natural sources such as vegetative sources, for example trees.

The fibrous elements of the present invention may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments, polyesteramide filaments, and polycaprolactone filaments. The filaments may be monocomponent or multicomponent, such as bicomponent filaments.

"Fiber" as used herein means an elongate particulate as described above that exhibits a length of less than 5.08 cm (2 in.) and/or less than 3.81 cm (1.5 in.) and/or less than 2.54 cm (1 in.).

Fibers are typically considered discontinuous in nature. Non-limiting examples of fibers include pulp fibers, such as wood pulp fibers, and synthetic staple fibers such as polypropylene, polyethylene, polyester, copolymers thereof, rayon, lyocell, glass fibers and polyvinyl alcohol fibers.

Staple fibers may be produced by spinning a filament tow and then cutting the tow into segments of less than 5.08 cm (2 in.) thus producing fibers; namely, staple fibers.

In one example of the present invention, a fiber may be a naturally occurring fiber, which means it is obtained from a naturally occurring source, such as a vegetative source, for example a tree and/or plant, such as trichomes. Such fibers are typically used in papermaking and are oftentimes referred to as papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to fibrous structures made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories of fibers as well as other non-fibrous polymers such as fillers, softening agents, wet and dry strength agents, and adhesives used to facilitate the original papermaking.

In one example, the wood pulp fibers are selected from the group consisting of hardwood pulp fibers, softwood pulp fibers, and mixtures thereof. The hardwood pulp fibers may be selected from the group consisting of: tropical hardwood pulp fibers, northern hardwood pulp fibers, and mixtures thereof. The tropical hardwood pulp fibers may be selected from the group consisting of: eucalyptus fibers, acacia fibers, and mixtures thereof. The northern hardwood pulp fibers may be selected from the group consisting of: cedar fibers, maple fibers, and mixtures thereof.

In addition to the various wood pulp fibers, other cellulosic fibers such as cotton linters, rayon, lyocell, trichomes, seed hairs, and bagasse fibers can be used in this invention. Other sources of cellulose in the form of fibers or capable of being spun into fibers include grasses and grain sources.

"Trichome" or "trichome fiber" as used herein means an epidermal attachment of a varying shape, structure and/or function of a non-seed portion of a plant. In one example, a trichome is an outgrowth of the epidermis of a non-seed portion of a plant. The outgrowth may extend from an epidermal cell. In one embodiment, the outgrowth is a trichome fiber. The outgrowth may be a hairlike or bristlelike outgrowth from the epidermis of a plant.

Trichome fibers are different from seed hair fibers in that they are not attached to seed portions of a plant. For example, trichome fibers, unlike seed hair fibers, are not attached to a seed or a seed pod epidermis. Cotton, kapok, milkweed, and coconut coir are non-limiting examples of seed hair fibers.

Further, trichome fibers are different from nonwood bast and/or core fibers in that they are not attached to the bast, also known as phloem, or the core, also known as xylem portions of a nonwood dicotyledonous plant stem. Non-limiting examples of plants which have been used to yield nonwood bast fibers and/or nonwood core fibers include kenaf, jute, flax, ramie and hemp.

Further trichome fibers are different from monocotyledonous plant derived fibers such as those derived from cereal straws (wheat, rye, barley, oat, etc), stalks (corn, cotton, sorghum, *Hesperaloe funifera*, etc.), canes (bamboo, bagasse, etc.), grasses (esparto, lemon, sabai, switchgrass, etc), since such monocotyledonous plant derived fibers are not attached to an epidermis of a plant.

Further, trichome fibers are different from leaf fibers in that they do not originate from within the leaf structure. Sisal and abaca are sometimes liberated as leaf fibers.

Finally, trichome fibers are different from wood pulp fibers since wood pulp fibers are not outgrowths from the epidermis of a plant; namely, a tree. Wood pulp fibers rather originate from the secondary xylem portion of the tree stem.

"Fibrous structure" as used herein means a structure that comprises a first web material comprising a plurality of fibrous elements, for example a plurality of fibers, such as a plurality of pulp fibers. In one example, the first web material may comprise a plurality of wood pulp fibers. In another example, the first web material may comprise a plurality of non-wood pulp fibers, for example plant fibers, synthetic staple fibers, and mixtures thereof. In still another example, in addition to pulp fibers, the first web material may comprise a plurality of filaments, such as polymeric filaments, for example thermoplastic filaments such as polyolefin filaments (i.e., polypropylene filaments) and/or hydroxyl polymer filaments, for example polyvinyl alcohol filaments and/or polysaccharide filaments such as starch filaments, such as in the form of a coform web material where the fibers and filaments are commingled together and/or are present as discrete or substantially discrete layers within the first web material. In one example, a web material according to the present invention means an orderly arrangement of fibers alone and/or with filaments within a structure in order to perform a function. In one example, a fibrous structure according to the present invention means an association of fibrous elements that together form a structure capable of performing a function. In another example of the present invention, a fibrous structure comprises a plurality of inter-entangled fibrous elements, for example inter-entangled filaments. Non-limiting examples of web materials of the present invention include paper.

Non-limiting examples of processes for making the first web material of the fibrous structures of the present invention include known wet-laid papermaking processes, for example conventional wet-pressed (CWP) papermaking processes and through-air-dried (TAD), both creped TAD and uncreped TAD, papermaking processes, and air-laid papermaking processes. Such processes typically include steps of preparing a fiber composition in the form of a fiber suspension in a medium, either wet, more specifically aqueous medium, or dry, more specifically gaseous, i.e. with air as medium. The aqueous medium used for wet-laid processes is oftentimes referred to as a fiber slurry. The fiber slurry is then used to deposit a plurality of the fibers onto a forming wire, fabric, or belt such that an embryonic web material is formed, after which drying and/or bonding the fibers together results in a web material, for example the first web material. Further processing of the first web material may be carried out such that a finished first web material is formed. For example, in typical papermaking processes, the finished first web material is the web material that is wound on the reel at the end of papermaking, often referred to as a parent roll, and may subsequently be converted into a finished fibrous structure of the present invention, e.g. a single- or multi-ply fibrous structure and/or a single- or multi-ply sanitary tissue product.

In another example, the first web material is a coformed web material comprising a plurality of filaments and a plurality of fibers commingled together as a result of a coforming process.

"Embossed" as used herein with respect to a web material, a fibrous structure, and/or a sanitary tissue product means that a web material, a fibrous structure, and/or a sanitary tissue product has been subjected to a process which converts a smooth surfaced web material, fibrous structure, and/or sanitary tissue product to a decorative surface by replicating a design on one or more emboss rolls, which form a nip through which the web material, fibrous structure, and/or sanitary tissue product passes. Embossed does not include creping, microcreping, printing or other processes that may also impart a texture and/or decorative pattern to a web material, a fibrous structure, and/or a sanitary tissue product.

"Differential density", as used herein, means a web material that comprises one or more regions of relatively low fiber density, which are referred to as pillow regions, and one or more regions of relatively high fiber density, which are referred to as knuckle regions.

"Densified", as used herein means a portion of a fibrous structure and/or sanitary tissue product that is characterized by regions of relatively high fiber density (knuckle regions).

"Non-densified", as used herein, means a portion of a fibrous structure and/or sanitary tissue product that exhibits a lesser density (one or more regions of relatively lower fiber density) (pillow regions) than another portion (for example a knuckle region) of the fibrous structure and/or sanitary tissue product.

"Non-rolled" as used herein with respect to a fibrous structure and/or sanitary tissue product of the present invention means that the fibrous structure and/or sanitary tissue product is an individual sheet (for example not connected to adjacent sheets by perforation lines. However, two or more individual sheets may be interleaved with one another) that is not convolutedly wound about a core or itself. For example, a non-rolled product comprises a facial tissue.

"Creped" as used herein means creped off of a Yankee dryer or other similar roll and/or fabric creped and/or belt creped. Rush transfer of a fibrous structure alone does not result in a "creped" fibrous structure or "creped" sanitary tissue product for purposes of the present invention.

"Sanitary tissue product" as used herein means a soft, relatively low density fibrous structure useful as a wiping implement for post-urinary and post-bowel movement cleaning (toilet tissue), for otorhinolaryngological discharges (facial tissue), multi-functional absorbent and cleaning uses (absorbent towels) and wipes, such as wet and dry wipes. The sanitary tissue product may be convolutedly wound upon itself about a core or without a core to form a sanitary tissue product roll or may be in the form of discrete sheets.

In one example, the sanitary tissue product of the present invention comprises one or more fibrous structures according to the present invention.

The sanitary tissue products and/or fibrous structures of the present invention may exhibit a basis weight between about 1 g/m$^2$ to about 5000 g/m$^2$ and/or from about 10 g/m$^2$ to about 500 g/m$^2$ and/or from about 10 g/m$^2$ to about 300 g/m$^2$ and/or from about 10 g/m$^2$ to about 120 g/m$^2$ and/or from about 15 g/m$^2$ to about 110 g/m$^2$ and/or from about 20 g/m$^2$ to about 100 g/m$^2$ and/or from about 30 to 90 g/m$^2$ as determined by the Basis Weight Test Method described herein. In addition, the sanitary tissue product of the present invention may exhibit a basis weight between about 40 g/m$^2$ to about 120 g/m$^2$ and/or from about 50 g/m$^2$ to about 110 g/m$^2$ and/or from about 55 g/m$^2$ to about 105 g/m$^2$ and/or from about 60 g/m$^2$ to 100 g/m$^2$ as determined by the Basis Weight Test Method described herein.

The sanitary tissue products of the present invention may exhibit a total dry tensile strength of greater than about 59 g/cm and/or from about 78 g/cm to about 394 g/cm and/or from about 98 g/cm to about 335 g/cm. In addition, the sanitary tissue product of the present invention may exhibit a total dry tensile strength of greater than about 196 g/cm and/or from about 196 g/cm to about 394 g/cm and/or from about 216 g/cm to about 335 g/cm and/or from about 236 g/cm to about 315 g/cm. In one example, the sanitary tissue product exhibits a total dry tensile strength of less than about 394 g/cm and/or less than about 335 g/cm.

The sanitary tissue products of the present invention may exhibit a density of less than 0.60 g/cm$^3$ and/or less than 0.30 g/cm$^3$ and/or less than 0.20 g/cm$^3$ and/or less than 0.15 g/cm$^3$ and/or less than 0.10 g/cm$^3$ and/or less than 0.07 g/cm$^3$ and/or less than 0.05 g/cm$^3$ and/or from about 0.01 g/cm$^3$ to about 0.20 g/cm$^3$ and/or from about 0.02 g/cm$^3$ to about 0.15 g/cm$^3$ and/or from about 0.02 g/cm$^3$ to about 0.10 g/cm$^3$.

The sanitary tissue products of the present invention may be in the form of sanitary tissue product rolls. Such sanitary tissue product rolls may comprise a plurality of connected, but perforated sheets of fibrous structure, that are separably dispensable from adjacent sheets.

The sanitary tissue products of the present invention may comprise additives such as softening agents, temporary wet strength agents, permanent wet strength agents, bulk softening agents, lotions, silicones, wetting agents, latexes, patterned latexes and other types of additives suitable for inclusion in and/or on sanitary tissue products.

"Hydroxyl polymer" as used herein includes any hydroxyl-containing polymer that can be incorporated into a filament of the present invention. In one example, the hydroxyl polymer of the present invention includes greater than 10% and/or greater than 20% and/or greater than 25% by weight hydroxyl moieties. In another example, the hydroxyl within the hydroxyl-containing polymer is not part of a larger functional group such as a carboxylic acid group.

"Chemically different" as used herein with respect to two hydroxyl polymers means that the hydroxyl polymers are at least different structurally, and/or at least different in properties and/or at least different in classes of chemicals, for example polysaccharides, such as starch, versus non-polysaccharides, such as polyvinyl alcohol, and/or at least different in their respective solubility parameters.

"Non-thermoplastic" as used herein means, with respect to a material, such as a fibrous element as a whole and/or a polymer, such as a crosslinked polymer, within a fibrous element, that the fibrous element and/or polymer exhibits no melting point and/or softening point, which allows it to flow under pressure, in the absence of a plasticizer, such as water, glycerin, sorbitol, urea and the like.

"Non-cellulose-containing" as used herein means that less than 5% and/or less than 3% and/or less than 1% and/or less than 0.1% and/or 0% by weight of cellulose polymer, cellulose derivative polymer and/or cellulose copolymer is present in fibrous element. In one example, "non-cellulose-containing" means that less than 5% and/or less than 3% and/or less than 1% and/or less than 0.1% and/or 0% by weight of cellulose polymer is present in fibrous element.

"Crosslinking facilitator" and/or "crosslinking facilitator function" as used herein means any material that is capable of activating a crosslinking agent thereby transforming the crosslinking agent from its unactivated state to its activated state.

"Fast wetting surfactant" and/or "fast wetting surfactant component" and/or "fast wetting surfactant function" as used herein means a surfactant and/or surfactant component, such as an ion from a fast wetting surfactant, for example a sulfosuccinate diester ion (anion), that exhibits a Critical Micelle Concentration (CMC) of greater 0.15% by weight and/or at least 0.25% and/or at least 0.50% and/or at least 0.75% and/or at least 1.0% and/or at least 1.25% and/or at least 1.4% and/or less than 10.0% and/or less than 7.0% and/or less than 4.0% and/or less than 3.0% and/or less than 2.0% by weight.

"Polymer melt composition" or "Polysaccharide melt composition" as used herein means a composition comprising water and a melt processed polymer, such as a melt processed fibrous element-forming polymer, for example a melt processed hydroxyl polymer, such as a melt processed polysaccharide.

"Melt processed fibrous element-forming polymer" as used herein means any polymer, which by influence of elevated temperatures, pressure and/or external plasticizers may be softened to such a degree that it can be brought into a flowable state, and in this condition may be shaped as desired.

"Melt processed hydroxyl polymer" as used herein means any polymer that contains greater than 10% and/or greater than 20% and/or greater than 25% by weight hydroxyl groups and that has been melt processed, with or without the aid of an external plasticizer. More generally, melt processed hydroxyl polymers include polymers, which by the influence of elevated temperatures, pressure and/or external plasticizers may be softened to such a degree that they can be brought into a flowable state, and in this condition may be shaped as desired.

"Blend" as used herein means that two or more materials, such as a fibrous element-forming polymer, for example a hydroxyl polymer and a polyacrylamide are in contact with each other, such as mixed together homogeneously or non-homogeneously, within a filament. In other words, a filament formed from one material, but having an exterior coating of another material is not a blend of materials for purposes of the present invention. However, a fibrous element formed from two different materials is a blend of materials for purposes of the present invention even if the fibrous element further comprises an exterior coating of a material.

"Associate," "Associated," "Association," and/or "Associating" as used herein with respect to fibrous elements and/or with respect to a surface and/or surface material being associated with a fibrous structure and/or a first web material and/or a layer being associated with another layer within a layered fibrous structure means combining, either in direct contact or in indirect contact, fibrous elements and/or a surface material with a first web material such that a fibrous structure is formed. In one example, the associated fibrous elements and/or associated surface material may be bonded to the first web material, directly or indirectly, for example by adhesives and/or thermal bonds to form adhesive sites and/or thermal bond sites, respectively, within the fibrous structure.

In another example, the fibrous elements and/or surface material may be associated with the first web material, directly or indirectly, by being deposited onto the same first web material making belt.

In one example, the second layer is bonded to the first layer at a bond spacing of greater than 0.05 inches and/or at least 0.06 inches and/or at least 0.07 inches and/or at least 0.08 inches and/or at least 0.09 inches and/or at least 0.094 inches.

"Average Diameter" as used herein, with respect to a fibrous element, is measured according to the Average Diameter Test Method described herein. In one example, a fibrous element of the present invention exhibits an average diameter of less than 50 µm and/or less than 25 µm and/or less than 20 µm and/or less than 15 µm and/or less than 10 µm and/or less than 6 µm and/or greater than 1 µm and/or greater than 3 µm.

"Basis Weight" as used herein is the weight per unit area of a sample reported in lbs/3000 ft$^2$ or g/m$^2$ as determined by the Basis Weight Test Method described herein.

"Machine Direction" or "MD" as used herein means the direction parallel to the flow of the fibrous structure through a fibrous structure making machine and/or sanitary tissue product manufacturing equipment. Typically, the MD is substantially perpendicular to any perforations present in the fibrous structure "Cross Machine Direction" or "CD" as used herein means the direction perpendicular to the machine direction in the same plane of the fibrous structure and/or sanitary tissue product comprising the fibrous structure.

"Ply" or "Plies" as used herein means an individual fibrous structure optionally to be disposed in a substantially contiguous, face-to-face relationship with other plies, forming a multiple ply fibrous structure. It is also contemplated that a single fibrous structure can effectively form two "plies" or multiple "plies", for example, by being folded on itself.

In one example, the line elements of the present invention may comprise wet texture, such as being formed by wet molding and/or through-air-drying via a fabric and/or an imprinted through-air-drying fabric. In one example, the wet texture line elements are water-resistant.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Layered Fibrous Structures

Figure 3:
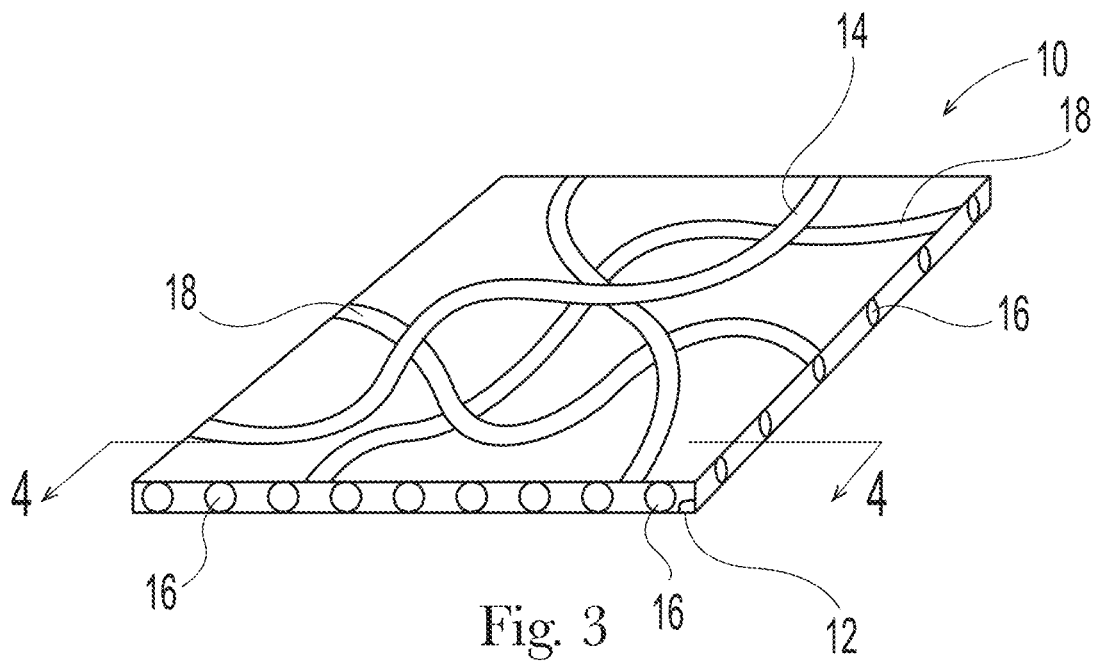
FIG. 3 is a schematic representation of an example of a layered fibrous structure according to the present invention.
Figure 4:
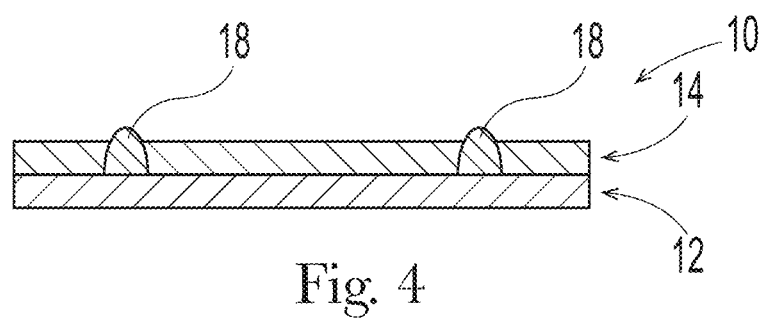
FIG. 4 is a schematic cross-sectional representation of the layered fibrous structure according to FIG. 3 taken along line 4-4.

In one example of the present invention as shown in FIGS. 3 and 4, a layered fibrous structure 10 comprises a first layer 12 comprising a plurality of first fibrous elements, for example a plurality of first filaments 16, and a second layer 14 comprising a plurality of second fibrous elements, for example a plurality of second filaments 18, which may be in the form of a second web material. The second layer 12 may be in the form of a surface material. The first filaments 16 comprise a first hydroxyl polymer, for example a polysaccharide, such as a starch and/or starch derivative. The second filaments 18 comprise a second hydroxyl polymer, for example a non-polysaccharide, such as polyvinyl alcohol and/or a polymer that exhibits a solubility parameter greater than 16.0 MPa$^{1/2}$ and/or greater than 17.0 MPa$^{1/2}$ and/or greater than 18.0 MPa$^{1/2}$ and/or greater than 18.8

MPa$^{1/2}$ and/or greater than 19.0 MPa$^{1/2}$ and/or greater than 20.0 MPa$^{1/2}$ and less than 25.6 MPa$^{1/2}$ and/or less than 25.0 MPa$^{1/2}$ and/or less than 24.0 MPa$^{1/2}$ and/or less than 23.0 MPa$^{1/2}$. The second layer 14 may be in the form of a scrim or scrim layer that forms the exterior surface and/or consumer-contacting surface of the layered fibrous structure and/or sanitary tissue product comprising the layered fibrous structure.

Figure 5:
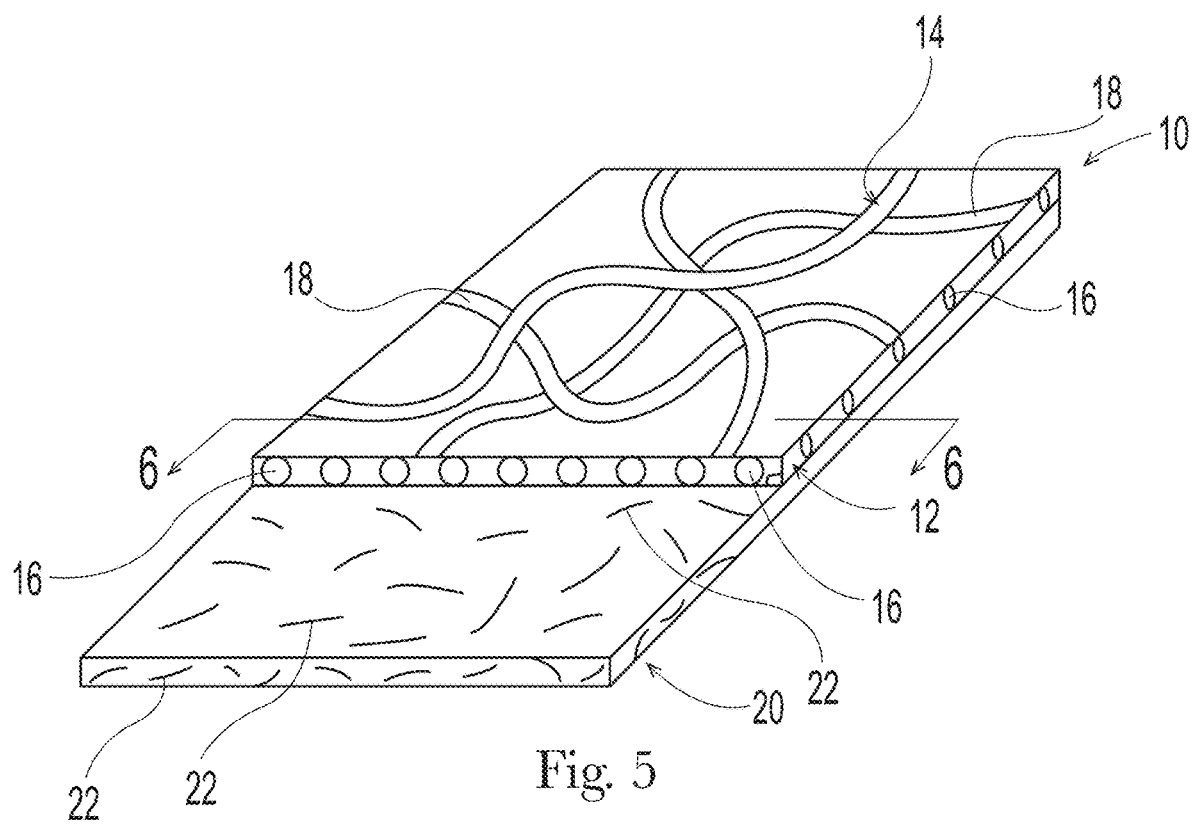
FIG. 5 is a schematic representation of another example of a layered fibrous structure according to the present invention.
Figure 6:
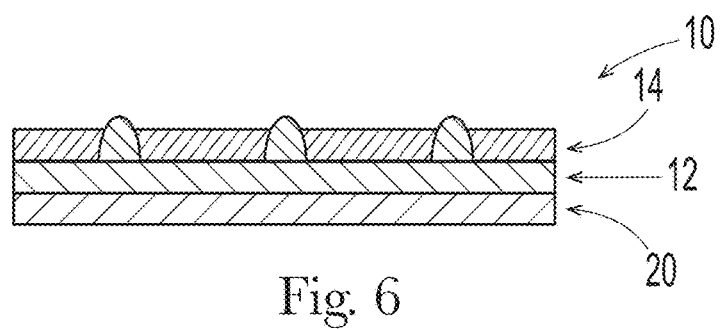
FIG. 6 is a schematic cross-sectional representation of the layered fibrous structure of FIG. 5 taken along line 6-6.

In another example, the layered fibrous structure 10 of the present invention as shown in FIGS. 5 and 6 is a layered fibrous structure 10 comprising a first layer 12 and a second layer 14 each comprising a plurality of fibrous elements, such as filaments 16, 18, respectively, that exhibit lengths of 5.08 cm or greater and/or 7.62 cm or greater and/or 10.16 cm or greater and/or 15.24 cm or greater and a third layer 20 comprising a comprising a plurality of fibrous elements, for example a plurality of fibers 22, for example pulp fibers, that exhibit a length of less than 5.08 cm and/or less than 3.81 cm and/or less than 3 cm and/or less than 2.54 cm and/or less than 1 cm and/or less than 8 mm and/or less than 5 mm. The third layer 20 may be in the form of a web material, for example a wet laid fibrous structure and/or an air laid fibrous structure.

The third layer 20 may exhibit a basis weight of greater than 10 gsm and/or greater than 15 gsm and/or greater than 20 gsm and/or greater than 40 gsm and/or less than 250 gsm and/or less than 200 gsm and/or less than 150 gsm and/or less than 100 gsm and/or less than 80 gsm.

Figure 7:
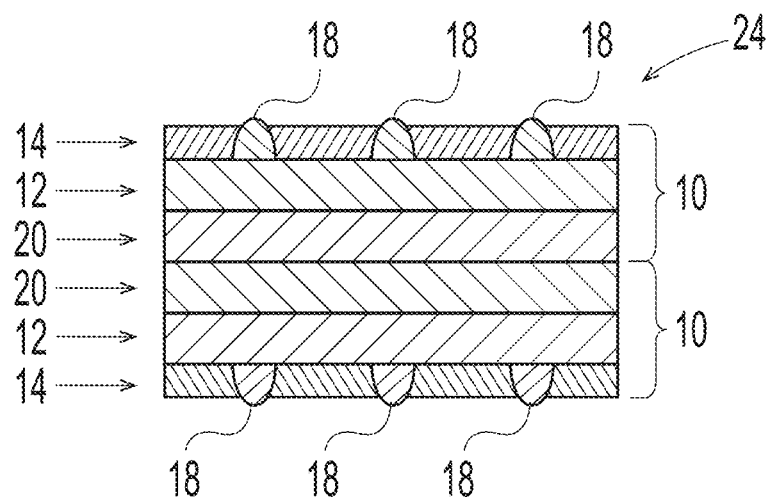
FIG. 7 is a schematic cross-sectional representation of an example of a multi-ply layered fibrous structure according to the present invention.

In one example as shown FIG. 7, a multi-ply layered fibrous structure 24, for example a multi-ply sanitary tissue product, may comprise one or more layered fibrous structures 10 of the present invention. In this case, the multi-ply layered fibrous structure 24 comprises two plies of the layered fibrous structure 10 as shown in FIGS. 5 and 6.

Figure 8:
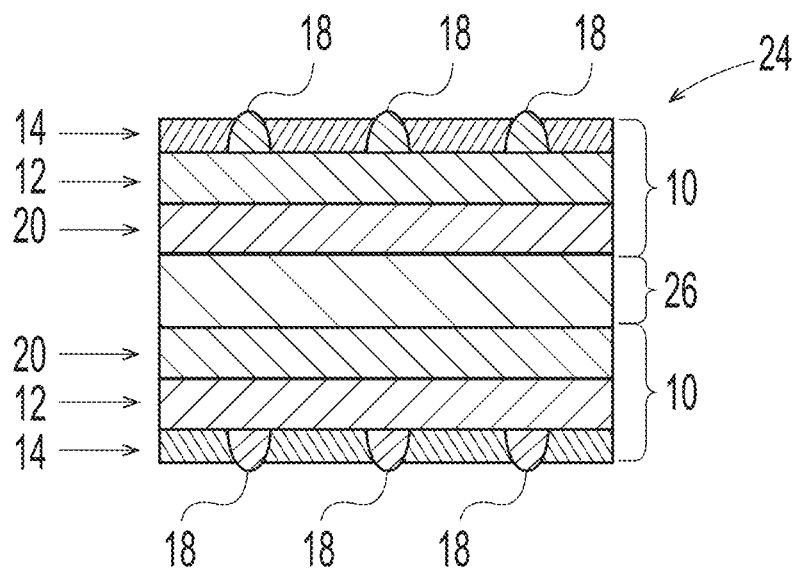
FIG. 8 is a schematic cross-sectional representation of another example of a multi-ply layered fibrous structure according to the present invention.

In another example as shown in FIG. 8, a multi-ply layered fibrous structure 24, for example a multi-ply sanitary tissue product, may comprise one or more layered fibrous structures 10 of the present invention along with one or more additional fibrous structure plies, for example one or more additional web materials, such as a wet laid fibrous structure and/or an air laid fibrous structure. In this case, the multi-ply layered fibrous structure 24 comprises two plies of the layered fibrous structure 10 as shown in FIGS. 5 and 6 and an additional fibrous structure ply, for example a wet laid fibrous structure ply 26 positioned between and optionally associated with the one or both of the two plies of the layered fibrous structure 10.

In one example, the second layer 14 forms a consumer-contacting surface alone or in combination with portions of the first layer 12 such that during use of the layered fibrous structure 10 the consumer wipes the second layer 14 and optionally portions of the first layer 12 across the skin of the consumer or another person, such as the consumer's child. One of the benefits of the layered fibrous structure 10 is that it exhibits improved glide on skin properties, such as improved force variability (less than 1.40) and/or force to drag (less than 100) as measured according to the Glide on Skin Test Method described herein, without unacceptably pilling during use as shown in Prior Art FIGS. 1A and 1B compared to FIGS. 2A and 2B.

Figure 9:
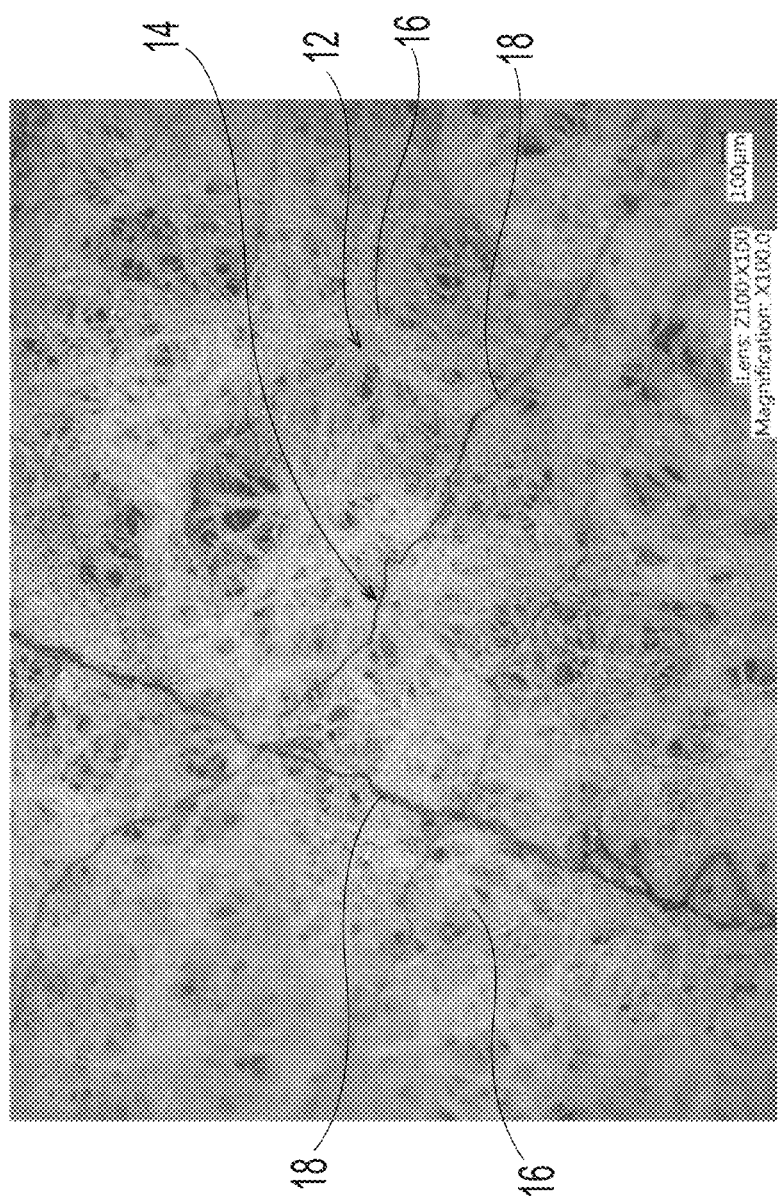
FIG. 9 is a magnified image of a top view of an example of a layered fibrous structure according to the present invention.

As shown in FIG. 9, the second layer 14 comprises a plurality of second filaments 18, for example polyvinyl alcohol filaments, that form a scrim layer or scrim on the first layer 12 of the first filaments 16, for example starch filaments. In one example, the first layer 12 exhibits a basis weight of greater than greater than 2 gsm and/or greater than 5 gsm and/or greater than 10 gsm and/or greater than 15 gsm and the second layer 14 exhibits a basis weight of at least 0.1 gsm and/or greater than 0.12 gsm and/or greater than 0.15 gsm and/or from about 0.1 gsm to about 5 gsm and/or from about 0.1 gsm to about 3 gsm and/or from about 0.1 gsm to about 1 gsm and/or from about 0.1 gsm to about 0.7 gsm and/or from about 0.1 gsm to about 0.5 gsm and/or from about 0.15 gsm to about 1 gsm and/or from about 0.15 gsm to about 0.7 gsm and/or from about 0.15 gsm to about 0.5 gsm. In one example, the second layer 14 exhibits a basis weight of at least 0.5 gsm and the second filaments 18 comprise a polyvinyl alcohol that exhibits a weight average molecular weight of greater than 25,000 g/mol and exhibits a hydrolysis of greater than 95%. In another example, the second layer 14 exhibits a basis weight of at least 0.15 gsm and the second filaments 18 comprise a polyvinyl alcohol that exhibits a weight average molecular weight of greater than 45,000 g/mol.

In one example, the polyvinyl alcohol exhibits a weight average molecular weight of greater than 25,000 g/mol and/or greater than 35,000 g/mol and/or greater than 45,000 g/mol and/or greater than 55,000 g/mol and/or greater than 60,000 g/mol.

In one example, the polyvinyl alcohol exhibits a hydrolysis of greater than 90% and/or greater than 92% and/or greater than 93% and/or greater than 94% and/or greater than 95% and/or greater than 98%.

The polyvinyl alcohol may be crosslinked or not crosslinked. For example, the polyvinyl alcohol may exhibit a low hydrolysis, such as less than about 92%, and may be crosslinked. In another example, the polyvinyl alcohol may exhibit a high hydrolysis, such as greater than 95%, and may not be crosslinked.

In one example, the first filaments exhibit an average diameter that is different from the second filaments as measured according to the Average Diameter Test Method described herein. In one example, the first filaments exhibit an average diameter that is greater than the average diameter of the second filaments as measured according to the Average Diameter Test Method described herein. In another example, the first filaments exhibit an average diameter that is less than the average diameter of the second filaments as measured according to the Average Diameter Test Method described herein. In one example, the average diameter of the first and second filaments is the same as measured according to the Average Diameter Test Method described herein.

In one example, the first filaments and/or second filaments exhibit an average diameter of greater than about 0.5 μm to less than about 20 μm and/or greater than about 1 μm to less than about 15 μm and/or greater than about 1 μm to less than about 10 μm and/or greater than about 1 μm to less than about 8 μm and/or greater than 2 μm to less than about 7 μm as measured according to the Average Diameter Test Method described herein.

In one example, the first filaments exhibit an average diameter of from about 3 μm to about 10 μm and/or from about 4 μm to about 8 μm and/or from about 5 μm to about 7 μm as measured according to the Average Diameter Test Method described herein.

In one example, the second filaments exhibit an average diameter of from about 0.5 μm to about 6 μm and/or from about 0.75 μm to about 5 μm and/or from about 1 μm to about 4 μm as measured according to the Average Diameter Test Method described herein.

In another example, the first filaments exhibit an average diameter of from about 3 μm to about 10 μm and/or from about 4 μm to about 8 μm and/or from about 5 μm to about 7 μm and the second filaments exhibit an average diameter of from about 0.5 μm to about 6 μm and/or from about 0.75 μm to about 5 μm and/or from about 1 μm to about 4 μm as measured according to the Average Diameter Test Method described herein.

The first hydroxyl polymer and/or the second hydroxyl polymer may be crosslinked, for example by an imidazolidinone and/or polycarboxylic acid. In one example, the first hydroxyl polymer may be crosslinked and the second hydroxyl polymer may not be crosslinked.

The first hydroxyl polymer and second hydroxyl polymer may exhibit different weight average molecular weights.

In one example, the first filaments 16 may comprise first hydroxyl polymer that exhibit different weight average molecular weights.

In one example, the second filaments 18 may comprise second hydroxyl polymers that exhibit different weight average molecular weights.

In one example, the first filaments 16 and/or second filaments 18 may comprise a plurality of smooth filaments, such as smooth spun filaments, in other words, the exterior surface of the filaments is non-textured, at least relative to any fibers, for example pulp fibers, such as wood pulp fiber present in the layered fibrous structure.

Figure 10:
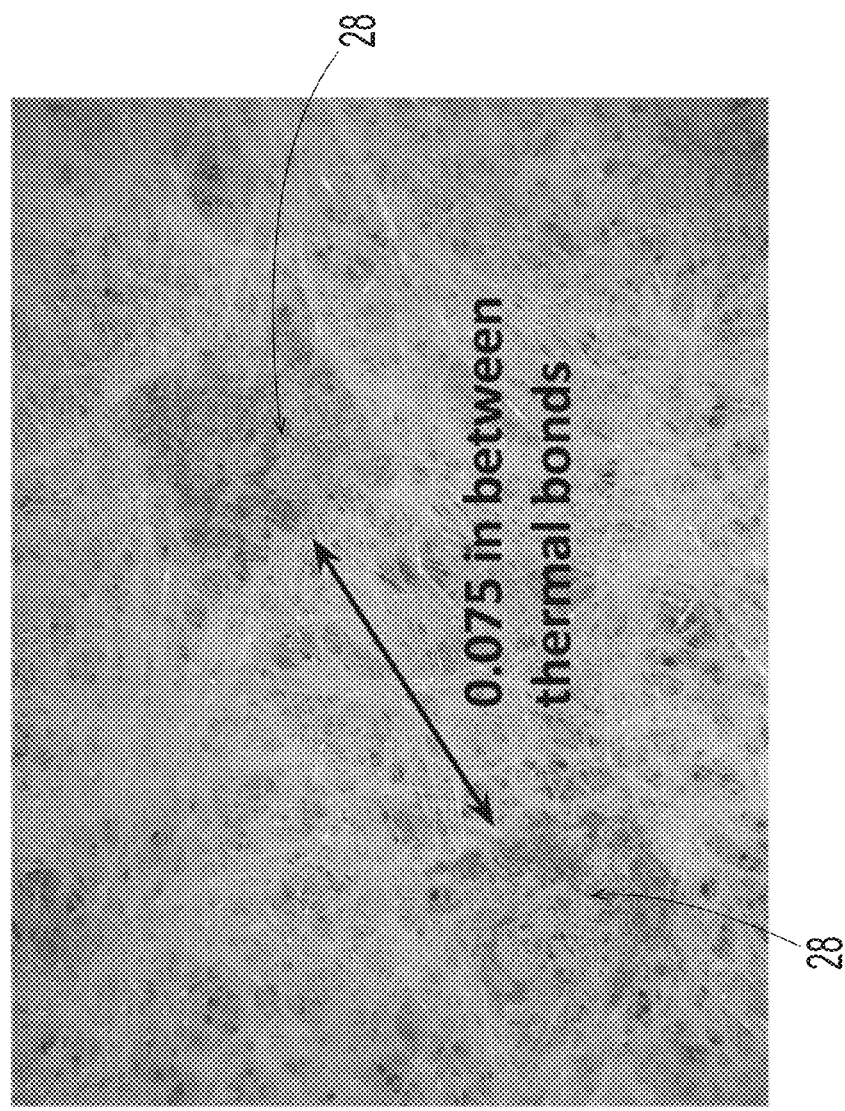
FIG. 10 is a magnified image of a top view of an example of a layered fibrous structure according to the present invention.
Figure 13A:
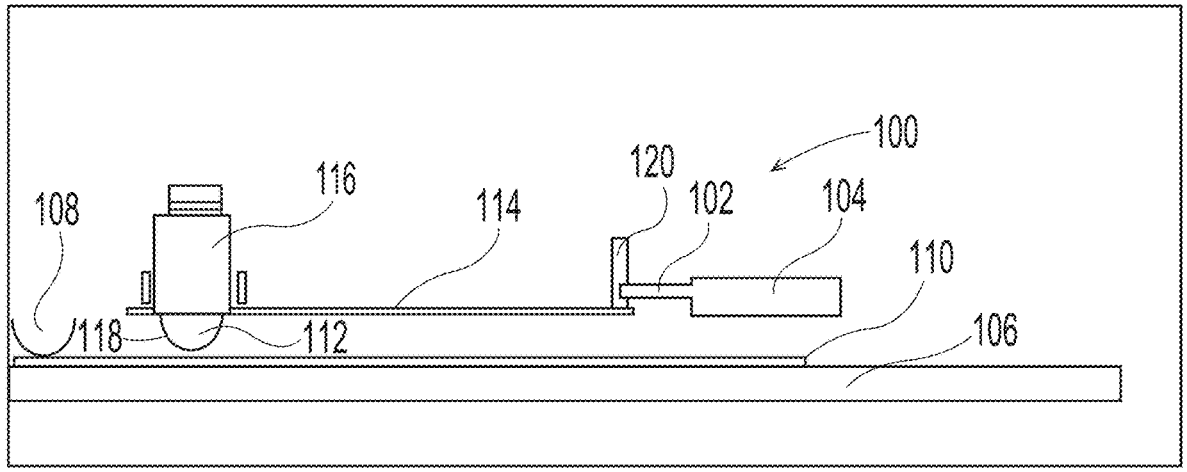
FIG. 13A is a schematic representation of a Glide on Skin Test Method set-up.
Figure 13B:
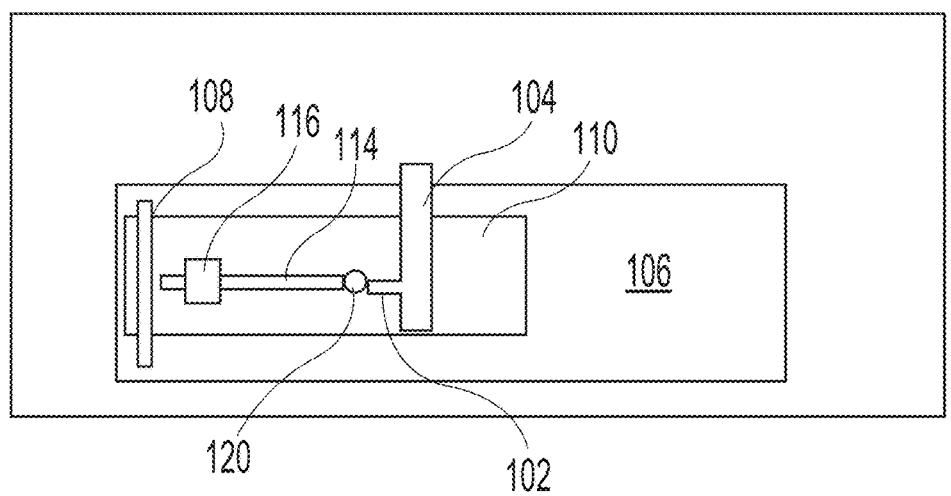
FIG. 13B is a schematic top view representation of FIG. 13A.
Figure 13C:
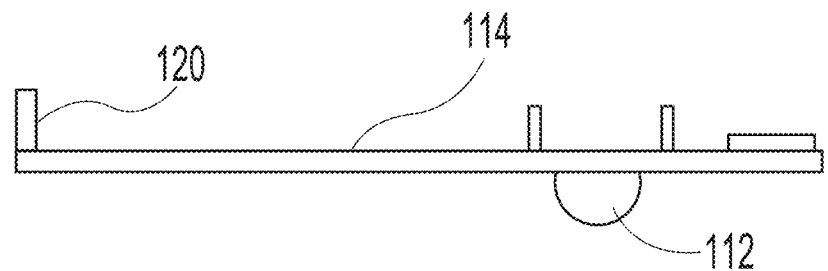
FIG. 13C is a schematic representation of a Probe used in FIG. 13A.
Figure 13D:
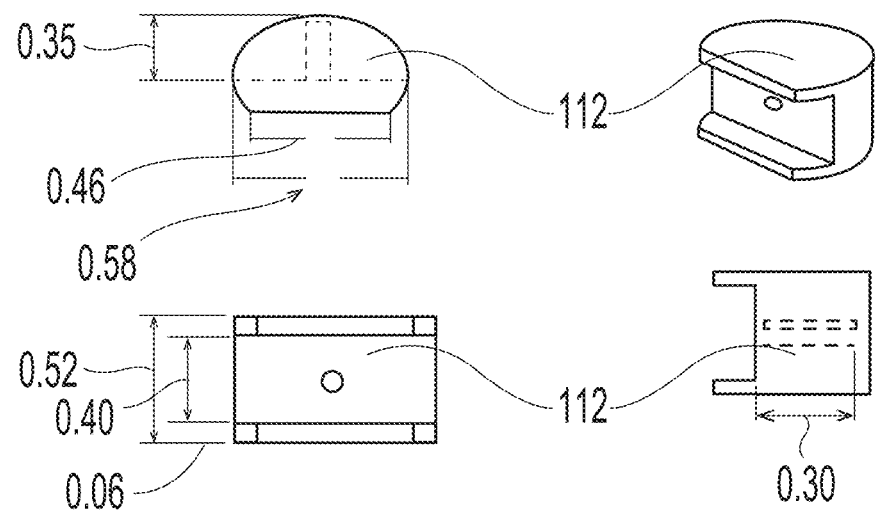
FIG. 13D are different views of the sled used in FIG. 13A.

In one example as shown in FIGS. 10 and 11, the second layer 14 may be bonded, for example thermally bonded, to the first layer 12 such that thermal bond sites 28 are created. The thermal bond sites may exhibit a bond spacing of greater than 0.05 inches and/or at least 0.06 inches and/or at least 0.07 inches and/or at least 0.08 inches and/or at least 0.09 inches and/or at least 0.094 inches.

In one example, it has been unexpectedly found that the layered fibrous structures of the present invention exhibit a novel combination of surface properties, for example feel and/or glide on skin as measured according to the Glide on Skin Test Method described herein, and Dry Lint Score as measured by the Lint Test Method described herein as shown in Table 1 below.

TABLE 1

| Product | Fibrous Elements | Dry Lint Score | Glide on Skin Force to Drag | Glide on Skin Force Variability |
|---|---|---|---|---|
| Invention | Filaments and fibers | 3.5 | <80 | <1.2 |
| Invention | Filaments and fibers | 3.1 | <80 | <1.2 |
| Invention | Filaments and fibers | 3.0 | <80 | <1.2 |
| Invention | Filaments and fibers | 4.2 | 71.89 | 1.13 |
| Invention | Filaments and fibers | 4.0 | 53.30 | 0.89 |
| Prior Art - Starch Filaments on a Wet Laid Surface - No Polyvinyl Alcohol Scrim Exterior Layer | Filaments and fibers | 4.4 | 54.43 | 0.93 |
| Charmin ® Ultra Strong | Fibers only | 2.2 | 68.66 | 1.60 |

TABLE 1-continued

| Product | Fibrous Elements | Dry Lint Score | Glide on Skin Force to Drag | Glide on Skin Force Variability |
|---|---|---|---|---|
| Charmin ® Ultra Soft | Fibers only | 8.9 | 71.22 | 1.31 |
| Quilted Northern ® Ultra Plush | Fibers only | 4.14 | 79.95 | 1.75 |
| Quilted Northern ® Ultra Soft & Strong | Fibers only | 6.2 | 75.29 | 1.82 |
| Angel Soft ® | Fibers only | 3.4 | 70.77 | 2.54 |
| Angel Soft ® (Double Roll) | Fibers only | — | 83.40 | 2.20 |
| Cottonelle ® Clean Care | Fibers only | 5.2 | 74.64 | 1.39 |
| Cottonelle ® Gentle Care (Wave) | Fibers only | 4.2 | 61.08 | 1.20 |
| Cottonelle ® Gentle Care (Line) | Fibers only | 4.6 | 61.96 | 1.40 |
| Cottonelle ® Ultra Comfort Care | Fibers only | 4.4 | 75.46 | 1.44 |

In one example, the layered fibrous structures of the present invention exhibit a Dry Lint Score of greater than 0 and/or greater than 0.5 and/or greater than 1.0 and/or greater than 1.5 and/or greater than 2.0 and/or greater than 2.3 and/or less than 8.0 and/or less than 7.0 and/or less than 6.0 and/or less than 5.0 and/or less than 4.5 and/or less than 4.0 and/or from about 0 to about 6.0 and/or from about 0.5 to about 5.0 and/or from about 1.0 to about 5.0 and/or from about 1.5 to about 5.0 and/or from about 2.0 to about 4.5 and/or greater than 2.3 to less than 4.0 and/or greater than 2.5 to less than 4.0 and/or greater than 2.75 to less than 4.0 and/or at least 3.0 to less than 4.0 and/or greater than 3.0 to less than 4.0 as measured according to the Lint Test Method described herein and one or more of the following:
  a. a Force to Drag Value of less than 80 and/or less than 75 and/or less than 70 and/or less than 65 and/or less than 60 and/or less than 55 as measured according to the Glide on Skin Test Method described herein; and/or
  b. a Force Variability Value of less than 1.60 and/or less than 1.55 and/or less than 1.50 and/or less than 1.45 and/or less than 1.40 and/or less than 1.35 and/or less than 1.30 and/or less than 1.25 and/or less than 1.20 and/or less than 1.15 and/or less than 1.10 and/or less than 1.05 and/or less than 1.00 and/or less than 0.95 and/or less than 0.90 as measure according to the Glide on Skin Test Method described herein.

Method for Making a Layered Fibrous Structure

In one example, the layered fibrous structure 10 of the present invention may be made by the fibrous structure making process 30 shown in FIG. 12 by optionally providing a third layer 20, which may be first web material, comprising a plurality of fibers, for example pulp fibers, and depositing a first layer 12 formed by a plurality of first filaments 16, for example starch filaments, from one or more first filament sources 32, such as a die, for example a meltblow die, such as a multi-row capillary die, which may form a second web material of inter-entangled filaments, onto at least one surface of the third layer 20 to form an intermediate fibrous structure. A surface of the first layer of the intermediate fibrous structure is then contacted with the second layer 14 formed by a plurality of second filaments 18, that creates a scrim layer or scrim. The second filaments 18 may be produced from one or more filament sources 32, such as a die, for example a meltblow die, such as a multi-row capillary die, which may form a third web material of inter-entangled filaments.

The fibrous structure making process 30 shown in FIG. 12 may further comprise the step of associating the second layer 14 to the first layer 12 and optionally, when present, the third layer 20 such as by bonding, for example creating thermal bond sites 28 (as shown in FIGS. 10 and 11) by passing the layered fibrous structure 10 through a nip 34 formed a patterned thermal bond roll 36 and an flat roll 38 to form a thermally bonded layered fibrous structure 10. The fibrous structure making process 30 may further optionally comprise the step of winding the layered fibrous structure 10 into a roll, such as a parent roll for unwinding in a converting operation to cut the roll into consumer-useable sized sanitary tissue product rolls and/or emboss the fibrous structure and/or perforate the fibrous structure into consumer-useable sized sheets of sanitary tissue product. In addition, the roll of fibrous structure may be combined with another fibrous structure ply, the same or different as the roll of layered fibrous structure to make a multi-ply fibrous structure 24 according to the present invention, examples of which are shown in FIGS. 7 and 8.

In one example, one or more plies of the layered fibrous structure according to the present invention may be combined, for example with glue, with another ply of fibrous structure, which may also be a layered fibrous structure according to the present invention, to form a multi-ply sanitary tissue product. In one example, the multi-ply sanitary tissue product may be formed by combining two or more plies of layered fibrous structures according to the present invention.

In addition, the layered fibrous structures of the present invention may be non-lotioned and/or may not contain a post-applied surface chemistry (in other words, the layered fibrous structure may be void of surface chemistries). In another example, the layered fibrous structures of the present invention may be lotioned and/or may contain a post-applied surface chemistry. In another example, the layered fibrous structures of the present invention may be creped or uncreped. In one example, the layered fibrous structures of the present invention are uncreped fibrous structures.

In addition to the layered fibrous structures of the present invention exhibiting improved surface properties as described herein, such layered fibrous structures also may exhibit improved cleaning properties, for example bowel movement cleaning properties, compared to known fibrous structures, for example known fibrous structures comprising hydroxyl polymer filaments and known fibrous structures, such as wet-laid and/or air-laid, comprising cellulose fibers, for example pulp fibers. Without wishing to be bound by theory, it is believed that the layered fibrous structures of the present invention exhibit improved skin benefit and/or glide on skin properties and/or cleaning properties due to the hydroxyl polymer fibrous elements of the present invention exhibiting greater absorbency, without a gooey feel, than pulp fibers, and therefore facilitates better, in reality and/or perception, absorption of bowel movement and/or urine more completely and/or faster than known fibrous structures. In addition, it is believed that the layered fibrous structures of the present invention that comprise a plurality of hydroxyl polymer fibrous elements, for example hydroxyl polymer filaments in an exterior layer, such as a scrim layer (for example the second layer 14), provides an improved adsorbency, without a gooey feel, than known fibrous structures, such that the hydroxyl polymer fibrous elements during use contact the user's skin surface and trap and/or lock in the bowel movement or portions thereof. Further, it is believed that the fibrous structures of the present invention that comprise a plurality of hydroxyl polymer fibrous elements, for example hydroxyl polymer filaments in an exterior layer that provide improved surface properties permits a user to apply more force to the fibrous structure during use because the hydroxyl polymer fibrous elements provide a cushion and/or buffer compared to known fibrous structures, especially known wet-laid and/or air-laid fibrous structures that consist or consist essentially of pulp fibers.

The layered fibrous structures of the present invention may be embossed and/or tufted that creates a three-dimensional surface pattern that provides aesthetics and/or improved cleaning properties. The level of improved cleaning properties relates to the % contact area under a load, such as a user's force applied to the fibrous structure during wiping, and/or % volume/area under a load, such as a user's force applied to the fibrous structure during wiping, created by the three-dimensional surface pattern on the surface of the fibrous structure. In one example, the emboss area may be greater than 10% and/or greater than 12% and/or greater than 15% and/or greater than 20% of the surface area of at least one surface of the fibrous structure.

The fibrous structure of the present invention may comprise two or more components, for example a first component comprising a first web material that exhibits a different bulk density from the second component, such as a the surface material. In one example, the first web material exhibits a lower bulk density than the surface material, for example second web material.

The fibrous structure comprises a least one surface, a consumer-contacting surface, that comes into contact with a consumer during use, such as during wiping. The surface of the fibrous structure may comprise and/or be defined by at least a portion of the second layer 14 of the layered fibrous structure.

First and Second Layers

The layered fibrous structure of the present invention comprises first and second layers as described above. The second layer can be referred to as a surface material of the layered fibrous structure and forms a scrim layer or scrim with respect to the layered fibrous structure. The first layer may, at least in part, in combination with the second layer, form a surface material of the layered fibrous structure that is different from the second layer and any first web material present therein. The first and/or second layers may be associated with the first web material, when present, directly (meaning in direct contact with a surface of the first web material) and/or indirectly (meaning one or more intermediate materials are positioned between the surface of the first web material and the surface material. In one example, the first and/or second layers are associated with the first web material, when present, through one or more bond sites, for example at least one of the bond sites comprise a thermal bond and/or at least one of the bond sites comprises an adhesive bond. In one example, the first and/or second layers may be directly bonded to a surface of the first web material, when present. In another example, the first and/or second layers may be indirectly bonded to a surface of the first web material, when present, by being bonded to one or more intermediate materials positioned between the surface of the first web material and the surface material. The intermediate materials may be fibrous elements, web materials, liquids, particles, and/or surface coatings, such as surface softening agents, present on the surface of the first web material, when present.

First Web Material

The first web material comprises a plurality of fibrous elements, for example a plurality of fibers. In one example, the first web material comprises a plurality of naturally-occurring fibers, for example pulp fibers, such as wood pulp fibers (hardwood and/or softwood pulp fibers). In another example, the first web material comprises a plurality of non-naturally occurring fibers (synthetic fibers), for example staple fibers, such as rayon, lyocell, polyester fibers, polycaprolactone fibers, polylactic acid fibers, polyhydroxyalkanoate fibers, and mixtures thereof.

The first web material may comprise one or more filaments, such as polyolefin filaments, for example polypropylene and/or polyethylene filaments, starch filaments, starch derivative filaments, cellulose filaments, polyvinyl alcohol filaments.

The first web material of the present invention may be single-ply or multi-ply web material. In other words, the first web materials of the present invention may comprise one or more first web materials, the same or different from each other so long as one of them comprises a plurality of pulp fibers.

In one example, the first web material comprises a wet laid fibrous structure ply, such as a through-air-dried fibrous structure ply, for example an uncreped, through-air-dried fibrous structure ply and/or a creped, through-air-dried fibrous structure ply.

In another example, the first web material and/or wet laid fibrous structure ply may exhibit substantially uniform density.

In another example, the first web material and/or wet laid fibrous structure ply may comprise a surface pattern.

In one example, the wet laid fibrous structure ply comprises a conventional wet-pressed fibrous structure ply. The wet laid fibrous structure ply may comprise a fabric-creped fibrous structure ply. The wet laid fibrous structure ply may comprise a belt-creped fibrous structure ply.

In still another example, the first web material may comprise an air laid fibrous structure ply.

The first web materials of the present invention may comprise a surface softening agent or be void of a surface softening agent, such as silicones, quaternary ammonium compounds, lotions, and mixtures thereof. In one example, the sanitary tissue product is a non-lotioned first web material.

The first web materials of the present invention may comprise trichome fibers or may be void of trichome fibers.

Patterned Molding Members

The first web materials of the present invention, when present in the layered fibrous structures of the present invention, may be formed on patterned molding members that result in the first web materials of the present invention. In one example, the pattern molding member comprises a non-random repeating pattern. In another example, the pattern molding member comprises a resinous pattern.

In one example, the first web material comprises a textured surface. In another example, the first web material comprises a surface comprising a three-dimensional (3D) pattern, for example a 3D pattern imparted to the first web material by a patterned molding member. Non-limiting examples of suitable patterned molding members include patterned felts, patterned forming wires, patterned rolls, patterned fabrics, and patterned belts utilized in conventional wet-pressed papermaking processes, air-laid papermaking processes, and/or wet-laid papermaking processes that produce 3D patterned sanitary tissue products and/or 3D patterned fibrous structure plies employed in sanitary tissue products. Other non-limiting examples of such patterned molding members include through-air-drying fabrics and through-air-drying belts utilized in through-air-drying papermaking processes that produce through-air-dried fibrous structures, for example 3D patterned through-air dried fibrous structures, and/or through-air-dried sanitary tissue products comprising the first web material.

In one example of the present invention, the first web material comprises a 3D patterned first web material having a surface comprising a 3D pattern comprising a first series of line elements that are oriented at an angle of between $-20°$ to $20°$ with respect the 3D patterned first web material's machine direction.

The first web material may be made by any suitable method, such as wet-laid, air laid, coform, hydroentangling, carding, meltblowing, spunbonding, and mixtures thereof. In one example the method for making the first web material of the present invention comprises the step of depositing a plurality of fibers onto a collection device, such as a 3D patterned molding member, such as a molding member comprising a first series of line elements that are oriented at an angle of between $-40°$ to $40°$ and/or $-30°$ to $30°$ and/or $-20°$ to $20°$ with respect to the 3D patterned first web material's machine direction such that a first web material is formed.

A "reinforcing element" may be a desirable (but not necessary) element in some examples of the molding member, serving primarily to provide or facilitate integrity, stability, and durability of the molding member comprising, for example, a resinous material. The reinforcing element can be fluid-permeable or partially fluid-permeable, may have a variety of embodiments and weave patterns, and may comprise a variety of materials, such as, for example, a plurality of interwoven yarns (including Jacquard-type and the like woven patterns), a felt, a plastic, other suitable synthetic material, or any combination thereof.

A non-limiting example of a patterned molding member suitable for use in the present invention comprises a through-air-drying belt. The through-air-drying belt may comprise a plurality of semi-continuous knuckles formed by semi-continuous line segments of resin arranged in a non-random, repeating pattern, for example a substantially machine direction repeating pattern of semi-continuous line segments supported on a support fabric comprising filaments. In this case, the semi-continuous line segments are curvilinear, for example sinusoidal. The semi-continuous knuckles are spaced from adjacent semi-continuous knuckles by semi-continuous pillows which constitute deflection conduits into which portions of a fibrous structure ply being made on the through-air-drying belt deflect. A resulting first web material being made on the through-air-drying belt may comprise semi-continuous pillow regions imparted by the semi-continuous pillows of the through-air-drying belt. The sanitary tissue product may further comprise semi-continuous knuckle regions imparted by the semi-continuous knuckles of the through-air-drying belt. The semi-continuous pillow regions and semi-continuous knuckle regions may exhibit different densities, for example, one or more of the semi-continuous knuckle regions may exhibit a density that is greater than the density of one or more of the semi-continuous pillow regions.

Non-Limiting Examples of Making First Web Materials

The first web materials of the present invention may be made by any suitable papermaking process, such as conventional wet press papermaking process, through-air-dried papermaking process, belt-creped papermaking process, fabric-creped papermaking process, creped papermaking process, uncreped papermaking process, coform process, and air-laid process, so long as the first web material comprises a plurality of fibers. In one example, the first web material is made on a molding member of the present invention is used to make the first web material of the present invention. The method may be a first web material making process that uses a cylindrical dryer such as a Yankee (a Yankee-process) or it may be a Yankeeless process as is used to make substantially uniform density and/or uncreped first web materials (fibrous structures). Alternatively, the first web materials may be made by an air-laid process and/or meltblown and/or spunbond processes and any combinations thereof so long as the first web materials of the present invention are made thereby.

First and Second Filaments

The first and/or second filaments of the present invention may be produced from a polymer melt composition, for example a hydroxyl polymer melt composition such as an aqueous hydroxyl polymer melt composition, comprising a hydroxyl polymer, such as an uncrosslinked starch for example a dent corn starch, an acid-thinned starch, and/or a starch derivative such as an ethoxylated starch, a crosslinking system comprising a crosslinking agent, such as an imidazolidinone, and water. In one example, the crosslinking agent comprises less than 2% and/or less than 1.8% and/or less than 1.5% and/or less than 1.25% and/or 0% and/or about 0.25% and/or about 0.50% by weight of a base, for example triethanolamine. It has unexpectedly been found that the reducing the level of base in the crosslinking agent used in the polymer melt composition results in more effective crosslinking. In one example, the first and/or second filaments of the present invention comprise greater than 25% and/or greater than 40% and/or greater than 50% and/or greater than 60% and/or greater than 70% to about 95% and/or to about 90% and/or to about 80% by weight of the fibrous element of a hydroxyl polymer, such as starch, which may be in a crosslinked state. In one example, the fibrous element comprises an ethoxylated starch and an acid thinned starch, which may be in their crosslinked states.

The first and/or second filaments may also comprise a crosslinking agent, such as an imidazolidinone, which may be in its crosslinked state (crosslinking the hydroxyl polymers present in the first and/or second filaments) at a level of from about 0.25% and/or from about 0.5% and/or from about 1% and/or from about 2% and/or from about 3% and/or to about 10% and/or to about 7% and/or to about 5.5% and/or to about 4.5% by weight of the fibrous element. In addition to the crosslinking agent, the fibrous element may comprise a crosslinking facilitator that aids the crosslinking agent at a level of from 0% and/or from about 0.3% and/or from about 0.5% and/or to about 2% and/or to about 1.7% and/or to about 1.5% by weight of the fibrous element.

In one example, the hydroxyl polymer fibrous element, for example hydroxyl polymer filament, comprises a crosslinked hydroxyl polymer, such as a crosslinked starch and/or starch derivative.

The polymer melt composition may also comprise a surfactant, such as a sulfosuccinate surfactant. A non-limiting example of a suitable sulfosuccinate surfactant comprises Aerosol® AOT (a sodium dioctyl sulfosuccinate) and/or Aerosol® MA-80 (a sodium dihexyl sulfosuccinate), which are commercially available from Cytec. The surfactant, such as a sulfosuccinate surfactant, may be present at a level of from 0% and/or from about 0.1% and/or from about 0.3% to about 2% and/or to about 1.5% and/or to about 1.1% and/or to about 0.7% by weight of the fibrous element.

In addition to the crosslinking agent, the polymer melt composition may comprise a crosslinking facilitator such as ammonium salts of methanesulfonic acid, ethanesulfonic acid, propanesulfonic acid, isopropylsulfonic acid, butanesulfonic acid, isobutylsulfonic acid, sec-butylsulfonic acids, benzenesulfonic acid, toluenesulfonic acid, xylenesulfonic acid, cumenesulfonic acid, alkylbenzenesulfonic, alkylnaphthalenedisulfonic acids.

The first and/or second filaments may also comprise a polymer selected from the group consisting of: polyacrylamide and its derivatives; acrylamide-based copolymers, polyacrylic acid, polymethacrylic acid, and their esters; polyethyleneimine; copolymers made from mixtures of monomers of the aforementioned polymers; and mixtures thereof at a level of from 0% and/or from about 0.01% and/or from about 0.05% and/or to about 0.5% and/or to about 0.3% and/or to about 0.2% by weight of the fibrous element. Such polymers may exhibit a weight average molecular weight of greater than 500,000 g/mol. In one example, the fibrous element comprises polyacrylamide.

The first and/or second filaments may also comprise various other ingredients such as propylene glycol, sorbitol, glycerin, and mixtures thereof.

One or more hueing agents, such as Violet CT may also be present in the polymer melt composition and/or first and/or second filaments formed therefrom.

In one example, the first and/or second filaments, of the present invention comprise a fibrous element-forming polymer, such as a hydroxyl polymer, for example a crosslinked hydroxyl polymer. In one example, the first and/or second filaments may comprise two or more fibrous element-forming polymers, such as two or more hydroxyl polymers. In another example, the fibrous element may comprise two or more fibrous element-forming polymers, such as two or more hydroxyl polymers, at least one of which is starch and/or a starch derivative. In still another example, the first and/or second filaments of the present invention may comprise two or more fibrous element-forming polymers at least one of which is a hydroxyl polymer and at least one of which is a non-hydroxyl polymer.

In yet another example, the first and/or second filaments of the present invention may comprise two or more non-hydroxyl polymers. In one example, at least one of the non-hydroxyl polymers exhibits a weight average molecular weight of greater than 1,400,000 g/mol and/or is present in the first and/or second filaments at a concentration greater than its entanglement concentration ($C_e$) and/or exhibits a polydispersity of greater than 1.32. In still another example, at least one of the non-hydroxyl polymers comprises an acrylamide-based copolymer.

In one example, the fibrous element comprises a filament. In another example, the fibrous element comprises a fiber, such as a filament that has been cut into fibers.

In one example, at least one of the first filaments exhibits an Elongation at Rupture that is less than, for example less than 40% and/or less than 35% and/or less than 30% and/or less than 28% and/or less than 20%, the Elongation at Rupture of at least one of the second filaments as measured according to the Elongation at Rupture Test Method.

In one example, at least one of the second filaments exhibits an Elongation at Rupture of greater than 50% and/or greater than 80% and/or greater than 100% and/or greater than 120% and/or greater than 150% as measured according to the Elongation at Rupture Test Method.

Fibrous Element-Forming Polymers

The polymer melt compositions of the present invention, for example hydroxyl polymer melt compositions such as aqueous hydroxyl polymer melt compositions, and/or fibrous elements, such as filaments and/or fibers, of the present invention that associate to form fibrous structures of the present invention contain at least one fibrous element-forming polymer, such as a hydroxyl polymer, and may contain other types of polymers such as non-hydroxyl polymers that exhibit weight average molecular weights of greater than 500,000 g/mol and mixtures thereof.

Non-limiting examples of hydroxyl polymers in accordance with the present invention include polyols, such as polyvinyl alcohol, polyvinyl alcohol derivatives, polyvinyl alcohol copolymers, starch, starch derivatives, starch copolymers, chitosan, chitosan derivatives, chitosan copolymers, cellulose, cellulose derivatives such as cellulose ether and ester derivatives, cellulose copolymers, hemicellulose, hemicellulose derivatives, hemicellulose copolymers, gums, arabinans, galactans, proteins and various other polysaccharides and mixtures thereof.

In one example, a hydroxyl polymer of the present invention comprises a polysaccharide.

In another example, a hydroxyl polymer of the present invention comprises a non-thermoplastic polymer.

The hydroxyl polymer may have a weight average molecular weight of from about 10,000 g/mol to about 40,000,000 g/mol and/or greater than 100,000 g/mol and/or greater than 1,000,000 g/mol and/or greater than 3,000,000 g/mol and/or greater than 3,000,000 g/mol to about 40,000,000 g/mol. Higher and lower molecular weight hydroxyl polymers may be used in combination with hydroxyl polymers having a certain desired weight average molecular weight.

Polyvinyl alcohols herein can be grafted with other monomers to modify its properties. A wide range of monomers has been successfully grafted to polyvinyl alcohol. Non-limiting examples of such monomers include vinyl acetate, styrene, acrylamide, acrylic acid, 2-hydroxyethyl methacrylate, acrylonitrile, 1,3-butadiene, methyl methacrylate, methacrylic acid, vinylidene chloride, vinyl chloride, vinyl amine and a variety of acrylate esters. Polyvinyl alcohols comprise the various hydrolysis products formed from polyvinyl acetate. In one example the level of hydrolysis of the polyvinyl alcohols is greater than 70% and/or greater than 88% and/or greater than 95% and/or about 99%.

"Polysaccharides" as used herein means natural polysaccharides and polysaccharide derivatives and/or modified polysaccharides. Suitable polysaccharides include, but are not limited to, starches, starch derivatives, starch copolymers, chitosan, chitosan derivatives, chitosan copolymers, cellulose, cellulose derivatives, cellulose copolymers, hemicellulose, hemicellulose derivatives, hemicelluloses copolymers, gums, arabinans, galactans, and mixtures thereof. The polysaccharide may exhibit a weight average molecular weight of from about 10,000 to about 40,000,000 g/mol and/or greater than about 100,000 and/or greater than about 1,000,000 and/or greater than about 3,000,000 and/or greater than about 3,000,000 to about 40,000,000.

The polysaccharides of the present invention may comprise non-cellulose and/or non-cellulose derivative and/or non-cellulose copolymer hydroxyl polymers. Non-limiting example of such non-cellulose polysaccharides may be selected from the group consisting of: starches, starch derivatives, starch copolymers, chitosan, chitosan derivatives, chitosan copolymers, hemicellulose, hemicellulose derivatives, hemicelluloses copolymers, and mixtures thereof.

In one example, the hydroxyl polymer comprises starch, a starch derivative and/or a starch copolymer. In another example, the hydroxyl polymer comprises starch and/or a starch derivative. In yet another example, the hydroxyl polymer comprises starch. In one example, the hydroxyl polymer comprises ethoxylated starch. In another example, the hydroxyl polymer comprises acid-thinned starch. In still another example, the hydroxyl polymer comprises Dent corn starch.

As is known, a natural starch can be modified chemically or enzymatically, as well known in the art. For example, the natural starch can be acid-thinned, hydroxy-ethylated, hydroxy-propylated, ethersuccinylated or oxidized. In one example, the starch comprises a high amylopectin natural starch (a starch that contains greater than 75% and/or greater than 90% and/or greater than 98% and/or about 99% amylopectin). Such high amylopectin natural starches may be derived from agricultural sources, which offer the advantages of being abundant in supply, easily replenishable and relatively inexpensive. Chemical modifications of starch typically include acid or alkaline-catalyzed hydrolysis and chain scission (oxidative and/or enzymatic) to reduce molecular weight and molecular weight distribution. Suitable compounds for chemical modification of starch include organic acids such as citric acid, acetic acid, glycolic acid, and adipic acid; inorganic acids such as hydrochloric acid, sulfuric acid, nitric acid, phosphoric acid, boric acid, and partial salts of polybasic acids, e.g., $KH_2PO_4$, $NaHSO_4$; group Ia or IIa metal hydroxides such as sodium hydroxide, and potassium hydroxide; ammonia; oxidizing agents such as hydrogen peroxide, benzoyl peroxide, ammonium persulfate, potassium permanganate, hypochloric salts, and the like; and mixtures thereof.

"Modified starch" is a starch that has been modified chemically or enzymatically. The modified starch is contrasted with a native starch, which is a starch that has not been modified, chemically or otherwise, in any way.

Chemical modifications may also include derivatization of starch by reaction of its hydroxyl groups with alkylene oxides, and other ether-, ester-, urethane-, carbamate-, or isocyanate-forming substances. Hydroxyalkyl, ethersuccinylated, acetyl, or carbamate starches or mixtures thereof can be used as chemically modified starches. The degree of substitution of the chemically modified starch is from 0.001 to 3.0, and more specifically from 0.003 to 0.2. Biological modifications of starch may include bacterial digestion of the carbohydrate bonds, or enzymatic hydrolysis using enzymes such as amylase, amylopectase, and the like.

Generally, all kinds of natural starches can be used in the present invention. Suitable naturally occurring starches can include, but are not limited to: corn starch, potato starch, sweet potato starch, wheat starch, sago palm starch, tapioca starch, rice starch, soybean starch, arrow root starch, amioca starch, bracken starch, lotus starch, waxy maize starch, and high amylose corn starch. Naturally occurring starches, particularly corn starch and wheat starch, can be particularly beneficial due to their low cost and availability.

In one example, to generate rheological properties suitable for high-speed fibrous element spinning processes, the molecular weight of the natural, unmodified starch may be reduced. The optimum molecular weight is dependent on the type of starch used. For example, a starch with a low level of amylose component, such as a waxy maize starch, disperses rather easily in an aqueous solution with the application of heat and does not retrograde or recrystallize significantly. With these properties, a waxy maize starch can be used at a weight average molecular weight, for example in the range of 500,000 g/mol to 40,000,000 g/mol. Modified starches such as hydroxy-ethylated Dent corn starch, which contains about 25% amylose, or oxidized Dent corn starch tend to retrograde more than waxy maize starch but less than acid thinned starch. This retrogradation, or recrystallization, acts as a physical cross-linking to effectively raise the weight average molecular weight of the starch in aqueous solution. Therefore, an appropriate weight average molecular weight for a typical commercially available hydroxyethylated Dent corn starch with 2 wt. % hydroxyethylation or oxidized Dent corn starch is from about 200,000 g/mol to about 10,000,000 g/mol. For ethoxylated starches with higher degrees of ethoxylation, for example a hydroxyethylated Dent corn starch with 5 wt % hydroxyethylation, weight average molecular weights of up to 40,000,000 g/mol may be suitable for the present invention. For acid thinned Dent corn starch, which tends to retrograde more than oxidized Dent corn starch, the appropriate weight average molecular weight is from about 100,000 g/mol to about 15,000,000 g/mol.

The weight average molecular weight of starch may also be reduced to a desirable range for the present invention by physical/mechanical degradation (e.g., via the thermomechanical energy input of the processing equipment).

The natural starch can be hydrolyzed in the presence of an acid catalyst to reduce the molecular weight and molecular weight distribution of the composition. The acid catalyst can be selected from the group consisting of hydrochloric acid, sulfuric acid, phosphoric acid, citric acid, ammonium chloride and any combination thereof. Also, a chain scission agent may be incorporated into a spinnable starch composition such that the chain scission reaction takes place substantially concurrently with the blending of the starch with other components. Non-limiting examples of oxidative chain scission agents suitable for use herein include ammonium persulfate, hydrogen peroxide, hypochlorite salts, potassium permanganate, and mixtures thereof. Typically, the chain scission agent is added in an amount effective to reduce the weight average molecular weight of the starch to the desirable range. It is found that compositions having modified starches in the suitable weight average molecular weight ranges have suitable shear viscosities, and thus improve processability of the composition. The improved processability is evident in less interruptions of the process (e.g., reduced breakage, shots, defects, hang-ups) and better surface appearance and strength properties of the final product, such as fibers of the present invention.

In one example, the fibrous element of the present invention is void of thermoplastic, water-insoluble polymers.

In one example, the fibrous element-forming polymers may be present in the aqueous hydroxyl polymer melt composition at an amount of from about 20% to about 50% and/or from about 30% to about 50% and/or from about 35% to about 48% by weight of the aqueous hydroxyl polymer melt composition and present in a polymeric structure, for example fibrous element and/or fibrous structure, at a level of from about 50% to about 100% and/or from about 60% to about 98% and/or from about 75% to about 95% by weight of the polymeric structure, for example fibrous element and/or fibrous structure.

Other Polymers

The polymer melt compositions of the present invention and/or fibrous elements, such as filaments of the present invention may comprise, in addition to the fibrous element-forming polymer, other polymers, such as non-hydroxyl polymers.

Non-limiting examples of suitable non-hydroxyl polymers that may be included in the fibrous elements of the present invention include non-hydroxyl polymers that exhibit a weight average molecular weight of greater than 500,000 g/mol and/or greater than 750,000 g/mol and/or greater than 1,000,000 g/mol and/or greater than 1,250,000 g/mol and/or at greater than 1,400,000 g/mol and/or at least 1,450,000 g/mol and/or at least 1,500,000 g/mol and/or less than 10,000,000 g/mol and/or less than 5,000,000 g/mol and/or less than 2,500.00 g/mol and/or less than 2,000,000 g/mol and/or less than 1,750,000 g/mol.

In one example, the non-hydroxyl polymer exhibits a polydispersity of greater than 1.10 and/or at least 1.20 and/or at least 1.30 and/or at least 1.32 and/or at least 1.40 and/or at least 1.45.

Non-limiting examples of suitable non-hydroxyl polymers include polyacrylamide and derivatives such as carboxyl modified polyacrylamide polymers and copolymers including polyacrylic, poly(hydroxyethyl acrylic), polymethacrylic acid and their partial esters; vinyl polymers including polyvinylalcohol, polyvinylpyrrolidone, and the like; polyamides; polyalkylene oxides such as polyethylene oxide and mixtures thereof. Copolymers or graft copolymers made from mixtures of monomers selected from the aforementioned polymers are also suitable herein. Non-limiting examples of commercially available polyacrylamides include nonionic polyacrylamides such as N300 from Kemira or Hyperfloc® NF221, NF301, and NF241 from Hychem, Inc.

In one example, the non-hydroxyl polymers may be present in an amount of from about 0.01% to about 10% and/or from about 0.05% to about 5% and/or from about 0.075% to about 2.5% and/or from about 0.1% to about 1%, by weight of the aqueous hydroxyl polymer melt composition, filament and/or fibrous structure.

In yet another example, the non-hydroxyl polymer comprises a linear polymer. In another example, the non-hydroxyl polymer comprises a long chain branched polymer. In still another example, the non-hydroxyl polymer is compatible with the hydroxyl polymer at a concentration greater than the non-hydroxyl polymer's entanglement concentration $C_e$.

Non-limiting examples of suitable non-hydroxyl polymers are selected from the group consisting of: polyacrylamide and its derivatives; polyacrylic acid, polymethacrylic acid and their esters; polyethyleneimine; copolymers made from mixtures of the aforementioned polymers; and mixtures thereof. In one example, the non-hydroxyl polymer comprises polyacrylamide. In one example, the fibrous elements comprises two or more non-hydroxyl polymers, such as two or more polyacrylamides, such at two or more different weight average molecular weight polyacrylamides.

In one example, the non-hydroxyl polymer comprises an acrylamide-based copolymer. In another example, the non-hydroxyl polymer comprises a polyacrylamide and an acrylamide-based copolymer. In one example, the acrylamide-based copolymer is derived from an acrylamide monomer and at least one monomer selected from the group consisting of: pendant hydroxyl-containing monomers, pendant hydroxyl alkylether-containing monomers, pendant hydroxyl alkylester-containing monomers, pendant hydroxyl alkylamide-containing monomers, and mixtures thereof. In one example, the acrylamide-based copolymer comprises an acrylamide monomeric unit and at least one monomeric unit selected from the group consisting of: pendant hydroxyl-containing monomeric units, pendant hydroxyl alkylether-containing monomeric units, pendant hydroxyl alkylester-containing monomeric units, pendant hydroxyl alkylamide-containing monomeric units, and mixtures thereof.

Crosslinking System

A crosslinking system comprising a crosslinking agent, such as an imidazolidinone, and optionally, a crosslinking facilitator, such as an ammonium salt, may be present in the polymer melt composition and/or may be added to the polymer melt composition before polymer processing of the polymer melt composition.

"Crosslinking agent" as used herein means any material that is capable of crosslinking a hydroxyl polymer within a polymer melt composition according to the present. Non-limiting examples of suitable crosslinking agents include polycarboxylic acids and/or imidazolidinones, such as dihydroxyethyleneurea (DHEU). In one example, the crosslinking agent is in the form of a solution rather than a recrystallized form. In another example, the crosslinking agent comprises less than 2% and/or less than 1.8% and/or less than 1.5% and/or less than 1.25% and/or 0% and/or to about 0.25% and/or to about 0.5% by weight of a base, such as triethanolamine.

"Crosslinking facilitator" as used herein means any material that is capable of activating a crosslinking agent thereby transforming the crosslinking agent from its unactivated state to its activated state.

Upon crosslinking the hydroxyl polymer during the curing step, the crosslinking agent becomes an integral part of the polymeric structure as a result of crosslinking the hydroxyl polymer as shown in the following schematic representation:

Hydroxyl polymer—Crosslinking agent—Hydroxyl polymer

The crosslinking facilitator may include derivatives of the material that may exist after the transformation/activation of the crosslinking agent. For example, a crosslinking facilitator salt being chemically changed to its acid form and vice versa.

Non-limiting examples of suitable crosslinking facilitators include acids having a pKa of less than 6 or salts thereof. The crosslinking facilitators may be Bronsted Acids and/or salts thereof, such as ammonium salts thereof.

In addition, metal salts, such as magnesium and zinc salts, can be used alone or in combination with Bronsted Acids and/or salts thereof, as crosslinking facilitators.

Non-limiting examples of suitable crosslinking facilitators include benzoic acid, citric acid, formic acid, glycolic acid, lactic acid, maleic acid, phthalic acid, phosphoric acid, hypophosphoric acid, succinic acid, and mixtures thereof and/or their salts, such as their ammonium salts, such as ammonium glycolate, ammonium citrate, ammonium chloride, ammonium sulfate.

Additional non-limiting examples of suitable crosslinking facilitators include glyoxal bisulfate salts, primary amine salts, such as hydroxyethyl ammonium salts, hydroxypropyl ammonium salt, secondary amine salts, ammonium toluene sulfonate, ammonium benzene sulfonate, ammonium xylene sulfonate, magnesium chloride, and zinc chloride.

Surfactants

The polymer melt compositions of the present invention and/or fibrous elements of the present invention and fibrous structures formed therefrom may comprise one or more surfactants. In one example, the surfactant is a fast wetting surfactant. In another example, the surfactant comprises a non-fast wetting surfactant, such as Aerosol® OT from Cytec.

Non-limiting examples of suitable fast wetting surfactants include surfactants that exhibit a twin-tailed general structure, for example a surfactant that exhibits a structure VIIA or VIIB as follows.

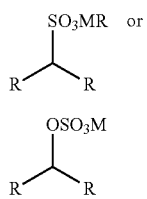

Structure VIIA

Structure VIIB wherein R is independently selected from substituted or unsubstituted, linear or branched aliphatic groups and mixtures thereof. In one example, R is independently selected from substituted or unsubstituted, linear or branched $C_4$-$C_7$ aliphatic chains and mixtures thereof. In another example, R is independently selected from substituted or unsubstituted, linear or branched $C_4$-$C_7$ alkyls and mixtures thereof and M is a suitable cation, such as an alkali metal cation and/or an ammonium cation. In another example, R is independently selected from substituted or unsubstituted, linear or branched $C_5$-$C_6$ alkyls and mixtures thereof. In still another example, R is independently selected from substituted or unsubstituted, linear or branched $C_6$ alkyls and mixtures thereof. In even another example, R is an unsubstituted, branched $C_6$ alkyl having the following structure VIII.

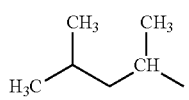

Structure VIII

In another example, R is independently selected from substituted or unsubstituted, linear or branched $C_5$ alkyls and mixtures thereof. In yet another example, R is independently selected from unsubstituted, linear $C_5$ alkyls and mixtures thereof. The $C_5$ alkyl may comprise a mixture of unsubstituted linear $C_5$ alkyls, for example $C_5$ n-pentyl, and/or 1-methyl branched $C_5$ alkyls as shown in the following structure IX.

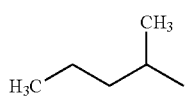

Structure IX

In even another example, R comprises a mixture of $C_4$-$C_7$ alkyls and/or a mixture of $C_5$-$C_6$ alkyls.

The fast wetting surfactants may be present in the polymer melt compositions, fibrous elements, and/or fibrous structures of the present invention, alone or in combination with other non-fast wetting surfactants.

In one example, the fast wetting surfactants of the present invention may be used individually or in mixtures with each other or in a mixture with one or more non-fast wetting surfactants, for example a $C_8$ sulfosuccinate surfactant where R is the following structure X

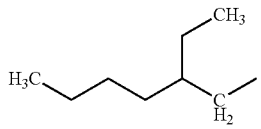

Structure X

In one example a fast wetting surfactant comprises a sulfosuccinate surfactant having the following structure XI.

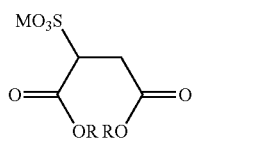

Structure XI wherein R is independently selected from substituted or unsubstituted, linear or branched aliphatic groups and mixtures thereof and M is a suitable cation, such as an alkali metal cation and/or an ammonium cation. In one example, R is independently selected from substituted or unsubstituted, linear or branched $C_4$-$C_7$ aliphatic chains and mixtures thereof. In another example, R is independently selected from substituted or unsubstituted, linear or branched $C_4$-$C_7$ alkyls and mixtures thereof. In another example, R is independently selected from substituted or unsubstituted, linear or branched $C_5$-$C_6$ alkyls and mixtures thereof. In still another example, R is independently selected from substituted or unsubstituted, linear or branched $C_6$ alkyls and mixtures thereof. In even another example, R is an unsubstituted, branched $C_6$ alkyl having the following structure XII.

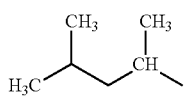

Structure XII

Non-limiting examples of fast wetting surfactants according to the present invention include sulfosuccinate surfactants, for example a sulfosuccinate surfactant that has structure VIII as its R groups (Aerosol® MA-80), a sulfosuccinate surfactant that has $C_4$ isobutyl as its R groups (Aerosol® IB), and a sulfosuccinate surfactant that has a mixture of $C_5$ n-pentyl and structure IX as its R groups (Aerosol® AY), all commercially available from Cytec.

Additional non-limiting examples of fast wetting surfactants according to the present invention include alcohol sulfates derived from branched alcohols such as Isalchem and Lial alcohols (from Sasol) ie. Dacpon 27 23 AS and Guerbet alcohols from Lucky Chemical. Still another example of a fast wetting surfactant includes paraffin sulfonates such as Hostapur SAS30 from Clariant.

Typically, the fast wetting surfactants are present in an amount of from about 0.01% to about 5% and/or from about 0.5% to about 2.5% and/or from about 1% to about 2% and/or from about 1% to about 1.5%, by weight of the polymer melt composition, fibrous element and/or fibrous structure.

A fast wetting surfactant may be present both in the interior and exterior of the fibrous elements produced from the polymer melt composition, which is distinguished from a surface only treatment of the formed fibrous elements. Any fast wetting surfactant that is present on the exterior of a fibrous element may be determined by extracting the fibrous element with a solvent that dissolves the surfactant, but does not swell the fibrous element and then analyzing for the surfactant by LC-mass spec. The surfactant that is present in the interior of the fibrous element may be determined by extracting the fibrous element with a solvent that dissolves the surfactant and also swells the fibrous elements, such as water/alcohol or water/acetone mixtures followed by analysis for surfactant by a technique such as LC mass spec. Alternatively, the fibrous element may be treated with an enzyme such as amylase that degrades the fibrous element-forming polymer, for example polysaccharide, but not the fast wetting surfactant and the resulting solution may be analyzed for the surfactant by LC-mass spec.

Hueing Agents

The polymer melt compositions and/or fibrous elements of the present invention may comprise one or more hueing agents. In one example, the total level of one or more hueing agents present within one or more, for example a plurality, of the fibrous elements of a fibrous structure of the present invention is less than 1% and/or less than 0.5% and/or less than 0.05% and/or less than 0.005% and/or greater than 0.00001% and/or greater than 0.0001% and/or greater than 0.001% by weight of the dry fibrous element and/or dry fibrous structure formed by fibrous elements containing the hueing agents. In one example, the total level of one or more hueing agents present within one or more, for example a plurality, of the fibrous elements of a fibrous structure of the present invention is from about 0.0001% to about 0.5% and/or from about 0.0005% to about 0.05% and/or from about 0.001% to about 0.05% and/or from about 0.001% to about 0.005% by weight of the dry fibrous element and/or dry fibrous structure formed by fibrous elements containing the hueing agents.

Hueing agents can be used either alone or in combination. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Non-limiting examples of hueing agents include dyes, dye-clay conjugates, and organic and inorganic pigments and mixtures thereof. Suitable dyes include small molecule dyes and polymeric dyes. Suitable small molecule dyes include small molecule dyes selected from the group consisting of dyes falling into the Colour Index (C.I.) classifications of Direct, Basic, Reactive or hydrolysed Reactive, Solvent or Disperse dyes for example that are classified as Blue, Violet, Red, Green or Black, and mixtures thereof. In another aspect, suitable small molecule dyes include small molecule dyes selected from the group consisting of Colour Index (Society of Dyers and Colourists, Bradford, UK) numbers Direct Violet dyes such as 9, 35, 48, 51, 66, and 99, Direct Blue dyes such as 1, 71, 80 and 279, Acid Red dyes such as 17, 73, 52, 88 and 150, Acid Violet dyes such as 15, 17, 24, 43, 49 and 50, Acid Blue dyes such as 15, 17, 25, 29, 40, 45, 75, 80, 83, 90 and 113, Acid Black dyes such as 1, Basic Violet dyes such as 1, 3, 4, 10 and 35, Basic Blue dyes such as 3, 16, 22, 47, 66, 75 and 159, Disperse or Solvent dyes such as those described in US 2008/034511 A1 or U.S. Pat. No. 8,268,016 B2, or dyes as disclosed in U.S. Pat. No. 7,208,459 B2, and mixtures thereof. In another aspect, suitable small molecule dyes include small molecule dyes selected from the group consisting of C.I. Acid Violet 17, Direct Blue 71, Direct Violet 51, Direct Blue 1, Acid Red 88, Acid Red 150, Acid Blue 29, Acid Blue 113 or mixtures thereof.

Suitable polymeric dyes include polymeric dyes selected from the group consisting of polymers containing covalently bound (sometimes referred to as conjugated) chromogens, (dye-polymer conjugates), for example polymers with chromogens co-polymerized into the backbone of the polymer and mixtures thereof. Polymeric dyes include those described in WO2011/98355, US 2012/225803 A1, US 2012/090102 A1, U.S. Pat. No. 7,686,892 B2, and WO2010/142503.

In another aspect, suitable polymeric dyes include polymeric dyes selected from the group consisting of hueing agents commercially available under the trade name of Liquitint® (Milliken, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® Violet CT, carboxymethyl cellulose (CMC) covalently bound to a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof.

Polymer Melt Composition

The polymer melt composition, for example an aqueous polymer melt composition such as an aqueous hydroxyl polymer melt composition, of the present invention comprises a melt processed fibrous element-forming polymer, such as a melt processed hydroxyl polymer, and a fast wetting surfactant according to the present invention.

The polymer melt compositions may have a temperature of from about 50° C. to about 100° C. and/or from about 65° C. to about 95° C. and/or from about 70° C. to about 90° C. when spinning fibrous elements from the polymer melt compositions.

In one example, the polymer melt composition of the present invention may comprise from about 30% and/or from about 40% and/or from about 45% and/or from about 50% to about 75% and/or to about 80% and/or to about 85% and/or to about 90% and/or to about 95% and/or to about 99.5% by weight of the polymer melt composition of a fibrous element-forming polymer, such as a hydroxyl polymer. The fibrous element-forming polymer, such as a hydroxyl polymer, may have a weight average molecular weight greater than 100,000 g/mol In one example, the fibrous elements of the present invention produced via a polymer processing operation may be cured at a curing temperature of from about 110° C. to about 260° C. and/or from about 110° C. to about 230° C. and/or from about 120° C. to about 200° C. and/or from about 130° C. to about 185° C. for a time period of from about 0.01 and/or 1 and/or 5 and/or 15 seconds to about 60 minutes and/or from about 20 seconds to about 45 minutes and/or from about 30 seconds to about 30 minutes. Alternative curing methods may include radiation methods such as UV, e-beam, IR and other temperature-raising methods.

Further, the fibrous elements may also be cured at room temperature for days, either after curing at above room temperature or instead of curing at above room temperature.

The fibrous elements of the present invention may include melt spun fibers and/or spunbond fibers, staple fibers, hollow fibers, shaped fibers, such as multi-lobal fibers and multi-component fibers, especially bicomponent fibers. The multicomponent fibers, especially bicomponent fibers, may be in a side-by-side, sheath-core, segmented pie, ribbon, islands-in-the-sea configuration, or any combination thereof. The sheath may be continuous or non-continuous around the core. The ratio of the weight of the sheath to the core can be from about 5:95 to about 95:5. The fibers of the present invention may have different geometries that include round, elliptical, star shaped, rectangular, and other various eccentricities.

In one example, the fibrous structures of the present invention comprise a plurality of fibrous elements, for example hydroxyl polymer filaments comprising a hydroxyl polymer such as a crosslinked hydroxyl polymer. In another example, the fibrous structures may comprise starch and/or starch derivative filaments. The starch filaments may further comprise polyvinyl alcohol and/or other polymers.

Non-Limiting Examples of Fibrous Structures

The materials used in the Examples below are as follows:

Amioca starch is a waxy corn starch with a weight average molecular weight greater than 30,000,000 g/mol supplied by Ingredion.

Hyperfloc NF301, a nonionic polyacrylamide (PAAM) has a weight average molecular weight between 5,000,000 and 6,000,000 g/mol, is supplied by Hychem, Inc., Tampa, Fla.

Aerosol OT-70 is an anionic sodium dihexyl sulfosuccinate surfactant supplied by Cytec Industries, Inc., Woodland Park, N.J.

Malic acid and ammonium methanesulfonate are supplied as 10 wt % and 35 wt % solutions respectively from Calvary Industries, Fairfield, Ohio Example 1—Comparative Example (No Polyvinyl Alcohol Scrim Layer)

A comparative layered fibrous structure is prepared as follows. In a 40:1 APV Baker twin-screw extruder with eight temperature zones, Amioca starch is mixed with ammonium methanesulfonate, Aerosol OT-70 surfactant, malic acid and water in zone 1. This mixture is then conveyed down the barrel through zones 2 through 8 and cooked into a melt-processed hydroxyl polymer composition. The composition in the extruder is 35% water where the make-up of solids is 99% Amioca, 0.5% Aerosol OT-70, 0.7% ammonium methanesulfonate, 0.1% malic acid. The extruder barrel temperature setpoints for each zone are shown below.

| | Zone | | | | | | | |
|---|---|---|---|---|---|---|---|---|
| | 1 | 2 | 3 | 4 | 5 | 6 | 7 | 8 |
| Temperature (° F.) | 60 | 60 | 60 | 120 | 320 | 320 | 320 | 320 |

The temperature of the melt exiting the 40:1 extruder is between 320 and 330° F. From the extruder, the melt is fed to a Mahr gear pump, and then delivered to a second extruder. The second extruder is a 13:1 APV Baker twin screw, which serves to cool the melt by venting a stream to atmospheric pressure. The second extruder also serves as a location for additives to the hydroxyl polymer melt. Particularly, a stream of 2.2 wt % Hyperfloc NF301 polyacrylamide is introduced at a level of 0.1% on a solids basis. The material that is not vented is conveyed down the extruder to a second Mahr melt pump. From here, the hydroxyl polymer melt is delivered to a series of static mixers where a cross-linker and water are added. The melt composition at this point in the process is 55-60% total solids. On a solids basis the melt is comprised of 92.4% Amioca starch, 5.5% cross-linker, 1.0% ammonium methanesulfonate, 1.0% surfactant, 0.1% Hyperfloc NF301, and 0.1% malic acid. From the static mixers the composition is delivered to a melt blowing spinneret via a melt pump.

A plurality of starch filaments is attenuated with a saturated air stream to form a layer of filaments that are collected on top of one another to form a starch filament layer, which may be a starch web material or starch nonwoven substrate. The starch filament layer exhibits a basis weight of 8 g/m² and is formed on top of a 21 g/m² wet laid pulp fibrous structure or wet laid pulp web material. The starch filament/wet laid pulp web material layered fibrous structure is then subjected to a thermal bonding process wherein thermal bond sites are formed between the starch filament layer and the wet laid pulp web material. The thermal bond roll has a diamond shaped pattern with 13% bond area, and results in a 0.075 in. distance between bond sites (similar to that shown in FIG. 10) in the layered fibrous structure. The finished layered fibrous structure is then wound about a core to produce a parent roll. Two parent rolls are then combined using hot melt adhesive to form a 2-ply layered fibrous structure, such as a 2-ply sanitary tissue product.

The starch filaments display an elongation at rupture (EAR) of about 10% to 18% as determined by the Elongation at Rupture Test Method. The relatively low EAR is because the filaments are primarily composed of starch which is a brittle material. Consequently, the resulting starch filaments fracture under the shear force of wiping and the resulting 2-ply layered fibrous structure (2-ply sanitary tissue product) exhibits significant linting and pilling as shown in Prior Art FIG. 1A.

Example 2—Inventive Example (with Polyvinyl Alcohol Scrim Layer)

A layered fibrous structure is prepared according to Example 1 except an extra layer (a scrim layer) of polyvinyl alcohol filaments are formed onto the top of the starch filament/wet laid pulp layered fibrous structure.

The polyvinyl alcohol filaments are prepared by the following procedure. Mowiol 10-98 polyvinyl alcohol (98% hydrolysis Kuraray) having a weight average molecular weight of 50,000 g/mol and water are added into a scraped, wall pressure vessel equipped with an overhead agitator in order to target a 35 wt % polyvinyl alcohol melt. The 35 wt % solution is cooked under pressure at 240° F. for 4 hours until the resulting melt is homogenous and transparent. The Mowiol 10-98 polyvinyl alcohol melt is pumped via gear pump to a static mixer where a cross-linker and cross-linker activator are added. From the static mixer the melt is delivered to a melt blowing spinneret.

A plurality of polyvinyl alcohol filaments is attenuated with a saturated air stream to form a layer of polyvinyl alcohol filaments of 0.15 g/m² that are collected on top of a starch filament/wet laid pulp web material layered fibrous structure made according to Example 1. The resulting layered fibrous structure from top to bottom is 0.15 g/m² polyvinyl alcohol filaments/8 g/m² starch filaments/21 g/m² wet laid pulp web material. The resulting layered fibrous structure is then subjected to a thermal bonding process wherein thermal bond sites are formed between the polyvinyl alcohol filament layer, the starch filament layer, and the wet laid pulp web material. The thermal bond roll has a diamond shaped pattern with 13% bond area, and results in a 0.075 in. distance between bond sites (as shown in FIG. 10) in the layered fibrous structure. The finished layered fibrous structure is then wound about a core to produce a parent roll. Two parent rolls are then combined using hot melt adhesive to form a 2-ply layered fibrous structure, such as a 2-ply sanitary tissue product.

The starch filaments display an elongation at rupture (EAR) of about 10% to 18% as determined by the Elongation at Rupture Test Method. The relatively low EAR is because the filaments are primarily composed of starch which is a brittle material. However, the Mowiol 10-98 polyvinyl alcohol filaments, at the surface of the layered fibrous structure exhibit an EAR of about 150 to 200%. The resulting polyvinyl alcohol filaments have sufficient elongation and toughness to absorb the energy during wiping, effectively protecting the brittle starch filaments which are underneath the polyvinyl alcohol filaments. The resulting 2-ply layered fibrous structure (2-ply sanitary tissue product) has significantly lower linting and pilling behavior as shown in FIG. 2A, compared to the 2-ply sanitary tissue product in Example 1 as shown in Prior Art FIG. 1A due to the polyvinyl alcohol filament scrim layer on the surface of the layered fibrous structure.

Example 3—Inventive Example (with Polyvinyl Alcohol Scrim Layer)

A polyvinyl alcohol filament/starch filament/wet laid pulp web material layered fibrous structure is prepared according to Example 2 except a higher basis weight of polyvinyl alcohol filaments is present in the polyvinyl alcohol filament layer.

A plurality of polyvinyl alcohol filaments is attenuated with a saturated air stream to form a layer of polyvinyl alcohol filaments of 0.70 g/m² that are collected on top of a starch filament/wet laid pulp web material layered fibrous structure. The resulting layered substrate from top to bottom is 0.70 g/m² polyvinyl alcohol filaments/8 g/m² starch filaments/21 g/m² wet laid pulp web material layered fibrous structure. The resulting layered fibrous structure is then subjected to a thermal bonding process wherein thermal bond sites are formed between the polyvinyl alcohol filament layer, the starch filament layer, and the wet laid pulp web material. The thermal bond roll has a circle shaped pattern with 10.3% bond area, and results in a 0.094 in. distance between bond sites (as shown in FIG. 11) in the layered fibrous structure. The finished layered fibrous structure is then wound about a core to produce a parent roll. Two parent rolls are then combined using hot melt adhesive to form a 2-ply layered fibrous structure, such as a 2-ply sanitary tissue product.

The starch filaments display an elongation at rupture (EAR) of about 10% to 18% as determined by the Elongation at Rupture Test Method. The relatively low EAR is because the filaments are primarily composed of starch which is a brittle material. However, the Mowiol 10-98 polyvinyl alcohol filaments, at the surface of the layered fibrous structure exhibit an EAR of about 150 to 200%. The resulting polyvinyl alcohol filaments have sufficient elongation and toughness to absorb the energy during wiping, effectively protecting the brittle starch filaments which are underneath the polyvinyl alcohol filaments. The resulting 2-ply layered fibrous structure (2-ply sanitary tissue product) has significantly lower linting and pilling (as shown in FIG. 2B) compared to the 2-ply sanitary tissue product in Example 1 (as shown in Prior Art FIG. 1A) due to the polyvinyl alcohol scrim layer on the surface of the layered fibrous structure. Compared to Example 2, a higher basis weight of the polyvinyl alcohol scrim layer (0.70 vs. 0.15 g/m$^2$) resulted in achieving the pilling/linting. Without wishing to be bound by theory, it is believed that the high basis weight polyvinyl alcohol scrim layer is required to prevent pilling/linting since the thermal bond site to thermal bond site distance is larger (0.094 vs. 0.075 in.).

Example 4—Inventive Example (with a Polyvinyl Alcohol Scrim Layer)

A polyvinyl alcohol filament/starch filament/wet laid pulp web material layered fibrous structure is prepared according to Example 2 except a higher basis weight of polyvinyl alcohol filaments is present in the polyvinyl alcohol filament layer and the polyvinyl alcohol exhibits a lower weight average molecular weight.

The polyvinyl alcohol filaments are prepared by the following procedure. Poval 4-98 polyvinyl alcohol (98% hydrolysis from Kuraray) having a weight average molecular weight of 25,000 g/mol and water are added into a scraped, wall pressure vessel equipped with an overhead agitator in order to target a 50 wt % polyvinyl alcohol melt. The 50 wt % solution is cooked under pressure at 240° F. for 4 hours until the resulting melt is homogenous and transparent. The Poval 4-98 polyvinyl alcohol melt is pumped via gear pump to a static mixer where a cross-linker and cross-linker activator are added. From the static mixer the melt is delivered to a melt blowing spinneret.

A plurality of polyvinyl alcohol filaments is attenuated with a saturated air stream to form a layer of polyvinyl alcohol filaments of 1.0 g/m$^2$ that are collected on top of a starch filament/wet laid pulp web material layered fibrous structure. The resulting layered fibrous structure from top to bottom is 1.0 g/m$^2$ polyvinyl alcohol filaments/8 g/m$^2$ starch filaments/21 g/m$^2$ wet laid pulp web material layered fibrous structure. The resulting layered fibrous structure is then subjected to a thermal bonding process wherein thermal bond sites are formed between the polyvinyl alcohol filament layer, the starch filament layer, and the wet laid pulp web material. The thermal bond roll has a circle shaped pattern with 10.3% bond area, and results in a 0.094 in. distance between bond sites (as shown in FIG. 11) in the layered fibrous structure. The finished layered fibrous structure is then wound about a core to produce a parent roll. Two parent rolls are then combined using hot melt adhesive to form a 2-ply layered fibrous structure, such as a 2-ply sanitary tissue product.

The starch filaments display an elongation at rupture (EAR) of about 10% to 18% as determined by the Elongation at Rupture Test Method. The relatively low EAR is because the filaments are primarily composed of starch which is a brittle material. The Poval 4-98 polyvinyl alcohol filaments, at the surface of the layered fibrous structure exhibit an EAR of about 80%. The low molecular weight Poval 4-98 polyvinyl alcohol filaments have lower elongation than the higher weight average molecular weight Mowiol 10-98 in Examples 2 and 3. Compared to Example 3, the pilling and linting behavior of this layered fibrous structure was very high (as shown in Prior Art FIG. 1B, which shows pilling/linting behavior in the "prior art" space even though the actual construction of the layered fibrous structure is inventive) even though the basis weight of the polyvinyl alcohol scrim layer is higher in the present example (1.0 vs. 0.70 g/m$^2$). The polyvinyl alcohol filaments spun from lower molecular weight polyvinyl alcohol (25,000 vs. 50,000 g/mol) does not possess sufficient elongation and toughness to resist the pilling (filament fracture)/linting behavior.

Example 5—Inventive Example

A layered fibrous structure according to the present invention is prepared as follows. A polyvinyl alcohol filament/starch filament/wet laid pulp web material layered fibrous structure is prepared similar to Example 2 except for basis weights and the starch filaments and polyvinyl alcohol filaments are melt blown onto a wet laid pulp web material having a flat, smooth, soft, non-textured surface, which is ultimately converted into a 3-ply product. The resulting layered fibrous structure from top to bottom is 0.15 g/m$^2$ polyvinyl alcohol filaments/4 g/m$^2$ starch filaments/13 g/m$^2$ wet laid pulp web material layered fibrous structure. This layered fibrous structure is then subjected to a thermal bonding process wherein thermal bond sites are formed between the polyvinyl alcohol filament layer, the starch filament layer, and the wet laid pulp web material. The thermal bond roll has a diamond shaped pattern with 10% bond area, and a 0.056 in. distance between bond sites in the layered fibrous structure. The finished layered fibrous structure is then wound about a core to produce a parent roll. Two parent rolls are then combined with a third inner ply using hot melt adhesive to form a 3-ply sanitary tissue product. The inner ply is a highly structured, bulky wet laid pulp web material having a basis weight of 13 g/m$^2$. The final 3-ply construct, from top to bottom, consists of 0.15 g/m$^2$ polyvinyl alcohol filaments/4 g/m$^2$ starch filaments, 13 g/m$^2$ flat, smooth wet laid pulp web material/13 g/m$^2$ highly structured, bulky wet laid pulp web material/13 g/m$^2$ flat, smooth wet laid pulp web material/4 g/m$^2$ starch filaments/0.15 g/m$^2$ polyvinyl alcohol filaments. Because the surface of the layered fibrous structure is composed of polyvinyl alcohol filaments with high elongation at rupture (EAR) (Same as Example 2), the resulting 3-ply sanitary tissue product has significantly lower linting and pilling behavior compared to the 2-ply sanitary tissue product in Example 1 due to the polyvinyl alcohol scrim layer on the surface of the 3-ply sanitary tissue product.

Test Methods Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 24 hours prior to the test. All plastic and paper board packaging articles of manufacture, if any, must be carefully removed from the samples prior to testing. The samples tested are "usable units." "Usable units" as used herein means sheets, flats from roll stock, pre-converted flats, fibrous structure, and/or single or multi-ply products. Except where noted all tests are conducted in such conditioned room, all tests are conducted under the same environmental conditions and in such conditioned room. Discard any damaged product. Do not test samples that have defects such as wrinkles, tears, holes, and like. All instruments are calibrated according to manufacturer's specifications.

Basis Weight Test Method

Basis weight of a fibrous structure is measured on stacks of twelve usable units using a top loading analytical balance with a resolution of ±0.001 g. The balance is protected from air drafts and other disturbances using a draft shield. A precision cutting die, measuring 8.890 cm±0.00889 cm by 8.890 cm±0.00889 cm is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in $g/m^2$ as follows:

$$\text{Basis Weight}=(\text{Mass of stack})/[(\text{Area of 1 square in stack})\times(\text{No. of squares in stack})]$$

$$\text{Basis Weight (g/m}^2)=\text{Mass of stack (g)}/[79.032 \text{ (cm}^2)/10,000 \text{ (cm}^2/\text{m}^2)\times 12]$$

Report result to the nearest 0.1 $g/m^2$. Sample dimensions can be changed or varied using a similar precision cutter as mentioned above, so as at least 645 square centimeters of sample area is in the stack.

Average Diameter Test Method

A fibrous structure comprising filaments of appropriate basis weight (approximately 5 to 20 grams/square meter) is cut into a rectangular shape sample, approximately 20 mm by 35 mm. The sample is then coated using a SEM sputter coater (EMS Inc, PA, USA) with gold so as to make the filaments relatively opaque. Typical coating thickness is between 50 and 250 nm. The sample is then mounted between two standard microscope slides and compressed together using small binder clips. The sample is imaged using a 10× objective on an Olympus BHS microscope with the microscope light-collimating lens moved as far from the objective lens as possible. Images are captured using a Nikon D1 digital camera. A Glass microscope micrometer is used to calibrate the spatial distances of the images. The approximate resolution of the images is 1 μm/pixel. Images will typically show a distinct bimodal distribution in the intensity histogram corresponding to the filaments and the background. Camera adjustments or different basis weights are used to achieve an acceptable bimodal distribution. Typically 10 images per sample are taken and the image analysis results averaged.

The images are analyzed in a similar manner to that described by B. Pourdeyhimi, R. and R. Dent in "Measuring fiber diameter distribution in nonwovens" (Textile Res. J. 69(4) 233-236, 1999). Digital images are analyzed by computer using the MATLAB (Version. 6.1) and the MATLAB Image Processing Tool Box (Version 3.) The image is first converted into a grayscale. The image is then binarized into black and white pixels using a threshold value that minimizes the intraclass variance of the thresholded black and white pixels. Once the image has been binarized, the image is skeltonized to locate the center of each fiber in the image. The distance transform of the binarized image is also computed. The scalar product of the skeltonized image and the distance map provides an image whose pixel intensity is either zero or the radius of the fiber at that location. Pixels within one radius of the junction between two overlapping fibers are not counted if the distance they represent is smaller than the radius of the junction. The remaining pixels are then used to compute a length-weighted histogram of filament diameters contained in the image.

Glide on Skin Test Method

To measure Force Variability and Force to Drag of a fibrous structure, the Glide on Skin Test Method is used.

First, make a first negative imprint of keratinous tissue by applying a material capable of forming a cast, or mold, onto a body part, for example, human skin and/or hair (non-limiting examples of suitable materials include PLY-O-LIFE™ and ALGIFORM™ casting materials, both available from Pink House Studios (St. Albans, Vt.); or other suitable equivalent materials). Remove the cast and allow to dry for 3-7 min. Make a positive mold that resembles the body part in both form and texture by placing for example silicone or other suitable material, such as dental materials, liquid rubber, room temperature vulcanized (RTV) rubber, plastic, or equivalents thereof) in the negative mold. Impress the positive mold into polyurethane or other suitable material to create a second negative mold, and allow the second negative mold to cure overnight. Optionally, press the positive molds into a unitary mold of polyurethane or other suitable material to create multiple negative molds. Optionally, coat the second negative mold with a 1:1 mixture of Skin-Flex SC-89 Stretch Paint (available from Burman Industries, Van Nuys, Calif.) (aliphatic polyurethane gloss paint) or equivalent, and Skin-Flex SC-89 Thinner (available from Burman Industries, Van Nuys, Calif.) or equivalent, to create a first substrate having a thickness of from about 100 μm to about 600 μm, and allow to dry for at least 12 hours. A substrate material (TC410 polyurethane, Part A (aromatic diisocyanate based pre-polymer, plasticizer mixture) and Part B, polyurethane curing agent, for example polyether polyol, di (2-ethylhexyl) adipate, aromatic amines, aryl mercuric carboxylate) with Parts A and B in a 1:1 ratio. Optionally, Part C (plasticizer-ester) may be included at a level of 1% to 150% by weight of the combination of Parts A and B. An acceptable alternative to TC 410 Parts A and B is Skin Flex, Part B, polyurethane curing agent (polyol-diamine mixture), with Part A and Part B in a 1:2 ratio; and optionally Skin Flex Part C (plasticizer-ester) at a level of 1% to 150% by weight of the combination of Parts A and B; all available from BJB Industries, Tustin, Calif.) may then be poured into the second negative mold (onto the gloss paint, if present) in an amount sufficient to produce a substrate having a thickness of approximately 0.1 mm-1 cm.

Combine equal amounts of Part A and Part B of TC-410 polyurethane, or equivalent materials, and thoroughly mix. Slowly pour a sufficient amount of the mixture into a desired mold, starting from the edge and gradually moving to the center of the mold. The amount should be sufficient to produce a substrate having a thickness of approximately 0.1 mm-1 cm. One example of a suitable amount is 25 mL in a mold having an area of 7 cm×14 cm. Allow to cure overnight. Begin peeling the polymer substrate from the mold, starting from the edge. Cut away the border if necessary. When poured into a mold as described above, the substrate thus made has the texture of human keratinous tissue of the body part used to make the first negative imprint.

A patterned surface resembling the surface of mammalian keratinous tissue, for example forearm skin, or hair, may be mechanically etched onto a metallic surface, following standard procedures of photolithography known to one of skill in the art. First, create a pattern that resembles the texture of human skin, for example, from the forearm, either as a computer-simulated image, or as an actual image (e.g. photographic, microscopic) from the human body part of interest. Transfer the pattern to a clear sheet to form a mask.

Place the mask onto a copper, brass or other appropriate metallic sheet, upon which a photoresist has been previously adhered or laminated. A variety of photoresists are available commercially, for example DuPont™ MX series dry film photoresists. The selection of the photoresist is based on the desired size, texture and/or feature of the keratinous tissue-texture. Expose the composite of metal/photoresist/mask to an appropriate dose of UV light, using industry standard exposure tools. Remove the mask, develop the photoresist and etch the metal layer using appropriate etching solutions, as described in standard textbooks on second level microelectronics packaging (Donald Seraphim, Ronald Lasky and Che-Yu Li: "Principles of Electronic Packaging," Mc-Graw Hill Inc. (1989)).

Pour a 1:1 mixture of Skin-Flex SC-89 Stretch-paint and Skin-Flex SC-89 Thinner, as described above, into the metallic mold and allowed to dry overnight. Adjust the amount of poured mixture, according to the size of the mold, to yield a final substrate that is typically between 600 to 800 µm thick. After overnight drying, the substrate material is carefully peeled off of the metallic mold as described above. This substrate material (skin mimic) is then used to measure the Force Variability and Force to Drag values of a fibrous structure as follows.

As shown in FIGS. 13A-13D, a Thwing-Albert Model 2260 Friction/Peel Tester 100 (Thwing-Albert Instrument Company, 14 W. Collings Ave. West Berlin, N.J. 08091) or equivalent if no longer available, is used in this testing. A 2000 gram capacity load cell 102 is used, accurate to ±0.25% of the measuring value. Cross-head arm 104 position is accurate to 0.01% per inch of travel distance.

The equipment must be located in a controlled environment (21°±3 C and 50±3% RH) and all testing must be conducted under these conditions.

The sample platform 106 is horizontally level, 20 inches long, by 6 inches wide and has a clamp 108 on one end used to secure the fibrous structure 110 to be tested (test sample). The sled 112 is composed of an aluminum rod with dimensions of 1 (+/−0.05) cm long, 0.75 (+/−0.05) cm in diameter. The top side of the sled 112 (the side away from the test sample) is milled flat and an aluminum arm 114 is bolted onto the top of the sled 112 (combined, the arm and sled are referred to as a "probe"). The sled's 112 long axis is bolted perpendicular to the long axis of the arm 114.

The total weight of the probe is about 37 grams. Lead shot is added to a small plastic vial 116 so as to bring the total weight of the probe and vial 116 to 100 (+/−0.1) grams. During testing the vial 116 is placed on the probe centered directly over the arm 114.

Equipment

Thwing-Albert Model 2260 Friction/Peel Tester equipped with a 2000 g
load cell—100
Constant temperature/humidity room (21°±3° C. and 50±3% RH)
Probe (Sled 112 and Arm 114)
Standard paper cutter (optional)
Scissors
Small Level Materials Skin Mimic as described above—118
Alcohol Wipes
Plastic Vial 116 (20 mL) with cap
Lead shot Cut 2 cm long×1 cm wide 'Probe Pieces' from the large skin mimic material described above utilizing a standard paper cutter and/or scissors. A "Probe Piece" of skin mimic 118 is attached to the sled 112 of the probe.

To prepare the probe for testing, place double sided tape over the bottom of the sled 112 so that it completely covers the exposed semi-circle. Attach a Probe Piece of skin mimic 118 prepared above, shiny side toward the surface of the semi-circle of the sled, texture side facing out, onto and over the double sided tape. The long axis of the skin mimic 118 should follow the curvature of the sled 112. Use an alcohol wipe to wipe down the surface of skin mimic 118 to remove any dust/oils/or debris. Set the probe aside in a manner that ensures the skin mimic 118 does not touch anything. Be careful not to transfer any materials to the skin mimic 118 when attaching it to the sled 112. If the skin mimic 118 is contaminated use another piece. Let the skin mimic 118 dry for one minute.

Prior to running the test, turn on the instrument 100 at least 30 minutes prior to initiating testing. Turn on the associated PC and launch the MAP software. Insure that the correct frictional force method is loaded into the MAP software. This correct frictional force method should instruct the TA arm 114 to move at a velocity of 1 mm/sec for 40 cm and then stop. The correct frictional force method should generate data at 250 readings per second and should store the position and force data a text file.

Next, attach the probe with the skin mimic 118 attached to the sled 112 by inserting the probe pin 120 into the hole in the load cell 102 and cross-head arm 104 assembly.

Next, place a small level on the probe. Raise or lower the load cell 102 and cross-head arm 104 assembly so that the probe is level and parallel to the sample platform 106. The load cell 102 and cross-head arm 104 assembly should be positioned so that the trailing edge of the probe will not interfere with the clamp 108 but be within a few millimeters of it. Zero the load cell 102 and cross-head arm 104 assembly at this position.

To run a fibrous structure 110 (test sample), insure that the fibrous structure 110 to be tested has been equilibrated in a controlled environment (21°±3° C. and 50±3% RH) for at least 2 hours before testing. Using scissors cut a fibrous structure 110 test sample 15 cm by 10 cm (6"×4") of fibrous structure 110. Do not tear or rip the test sample at a perforation site since this can distort the fibrous structure 110. Place the fibrous structure 110 test sample directly on the sample platform 106 so that one end of the fibrous structure 110 test sample is under the clamp 108 and the fibrous structure 110 test sample lies flat on the sample platform 106. Position the fibrous structure 110 test sample so that the area to be tested does not include a perforation. Lower the clamp 108 to prevent the fibrous structure 110 test sample from sliding. Next, place the probe (sled 112 and arm 114) on the fibrous structure 110 test sample and insert the probe pin 120 up through the hole in the load cell 102 and cross-head arm 104 assembly. Ensure that the sled 112 is connected and aligned properly. If the force reading is greater than 1 or less than −1 reposition the sled 112 to reduce the reading. Place the plastic vial 116 containing lead shot on top of the sled 112, positioned such that it is centered above the sled 112.

Next, press the "Test" button on the Thwing-Albert tester 100 to trigger the script operation. The test script is programmed to move the cross-head 104 (and therefore the attached sled 112) at a speed of 1 mm/min for a distance of 40 mm. During this time, the force and displaced distance readings are collected at a rate of 250 data points/sec. The script captures the force vs. distance data and automatically stores the data in a text file. Repeat the measurement procedure such that ten force versus distance profiles are generated. A new fibrous structure 110 test sample should be used for each test. The skin mimic 118 on the sled 112 should be replaced after every 10 pulls or sooner if there is detectable wear. The skin mimic 118 on the sled 112 should be replaced when switching fibrous structure or fibrous structure type.

A test should be considered invalid and the data thrown out if one or more of the following occurs during testing.
 a. The probe becomes detached from the load cell 102.
 b. The vial 116 containing the lead shot falls from the probe during testing.
 c. Any part of the skim mimic 118 moves past the end of the fibrous structure 110 test sample.
 d. The skin mimic 118 passes over a perforation in the fibrous structure 110 test sample.
 e. The fibrous structure 110 test sample rips or folds.
 f. The fibrous structure 110 test sample delaminates or sheds fibers that impact the force measurements.
 g. The fibrous structure 110 test sample becomes detached from the clamp 108.
 h. The skin mimic 118 becomes abraded or detached from the probe.
 i. The double sided tape used to attach the skin mimic 118 comes in contact with the fibrous structure 110 test sample.

Calculations:
1) Import the text data files into an Excel spreadsheet.
2) The Force to Drag Value is calculated as the mean of the force data excluding the first 5 cm and the last 5 cm of the data. The average of the ten averages is the reported as the Force to Drag Value.

$$CoF = \frac{\sum_{k}^{n} f_k}{n}$$

Where $f_k$ is the force recorded from 0.5 cm to 3.5 cm and "k" is the number of data points over the same range.

3) Again excluding the first 0.5 cm and the last 0.5 cm of data, the Force Variability Value is calculated by first calculating the absolute value of each individual data point from its local mean. The local mean is calculated using the force data within +/−2.5% of the total data field from each individual data point. Using the data rate and velocity of 250 pt/sec and 1 mm/sec over 30 cm (40 cm-2*5 cm), 7500 data points are collected during a test and so 2.5% of 7500 yields 188 pts. And so the average of the force data with +/−188 data points of each individual data point is used as the local mean. The average of the absolute values of each individual data point from its local mean yields the Force Variability Value for that test. The average of all ten Force Variability Values is reported as the Force Variability Value for the fibrous structure 110 being tested.

$$\text{Force Variability} = \frac{\sum |X_i - X_{Local}|}{n}$$

Wherein $X_i$ is each individual data point, $X_{Local}$ is the local mean around each $X_i$, and n is the total number of $X_i$s, wherein the total range is the same as the range used for the Force to Drag calculation; namely, 0.5 cm to 3.5 cm. The local mean is calculated over $X_i \pm 2.5\%$ of the total range or since the range is 3.0 cm (30 mm), the local mean becomes $X_i \pm 0.75$ mm.

Weight Average Molecular Weight Test Method

The weight average molecular weight and the molecular weight distribution (MWD) are determined by Gel Permeation Chromatography (GPC) using a mixed bed column. The column (Waters linear ultrahydrogel, length/ID: 300× 7.8 mm) is calibrated with a narrow molecular weight distribution polysaccharide, 107,000 g/mol from Polymer Laboratories). The calibration standards are prepared by dissolving 0.024 g of polysaccharide and 6.55 g of the mobile phase in a scintillation vial at a concentration of 4 mg/ml. The solution sits undisturbed overnight. Then it is gently swirled and filtered with a 5 micron nylon syringe filter into an auto-sampler vial.

The filtered sample solution is taken up by the auto-sampler to flush out previous test materials in a 100 μL injection loop and inject the present test material into the column. The column is held at 50° C. using a Waters TCM column heater. The sample eluded from the column is measured against the mobile phase background by a differential refractive index detector (Wyatt Optilab REX interferometric refractometer) and a multi-angle later light scattering detector (Wyatt DAWN Heleos 18 angle laser light detector) held at 50° C. The mobile phase is water with 0.03M potassium phosphate, 0.2M sodium nitrate, and 0.02% sodium azide. The flowrate is set at 0.8 mL/min with a run time of 35 minutes.

Elongation at Rupture Test Method

To measure the Elongation at Rupture of a filament, the filament and/or fibrous structure from which the filament is obtained is conditioned at 23° C.±1.0° C. and 50%±10% Relative Humidity for at least 72 hours. All subsequent steps are done under the same environmental conditions.

If needed, filaments of sufficient length are isolated from the fibrous structure. The isolated filaments should not be birefringent, i.e. should not be stretched beyond their yield point before measurement. Care is taken not to damage the filaments during the isolation process. If a filament is damaged, discard and obtain another filament from the fibrous structure.

Filaments are tested using a Favimat tensile tester (Textechno Herbert Stein GmbH & Co. KG, Mönchengladbach, Germany), equipped with a 210 cN load cell with a resolution of $10^{-4}$ cN. Test parameters are set as follows: Gauge length=1 mm, test speed=10 mm/min, drop off force=95% of maximum. Tests where multiple filaments had been tested, as indicated by a stepwise drop off of force, need to be discarded. This test is repeated for 30 different filaments obtained from the same fibrous structure, and the average value for Elongation at Rupture of the filaments is reported to the nearest %.

Lint Test Method
 i. Sample Preparation—
 Sample strips (a total of 4 if testing both sides, 2 if testing a single side) of fibrous structures and/or sanitary tissue products, which do not have abraded portions) 11.43 cm (4.5 inch) wide×30.48 cm to 40.64 cm (12-16 inch) long such that each sample strip can be folded upon itself to form a 11.43 cm (4.5 inch) wide (CD) by 10.16 cm (4.0 inch) long (MD) rectangular implement having a total basis weight of between 140 to 200 g/m$^2$ are obtained and conditioned according to Tappi Method #T402OM-88. For both side testing, makeup two rectangular implements as described above with a first side out and then two rectangular implements with the other side out (keep track of which are which).

For sanitary tissue products formed from multiple plies of fibrous structure, this test can be used to make a lint measurement on the multi-ply sanitary tissue product, or, if the plies can be separated without damaging the sanitary tissue product, a measurement can be taken on the individual plies making up the sanitary tissue product. If a given sample differs from surface to surface, it is necessary to test both surfaces and average the scores in order to arrive at a composite lint score. In some cases, sanitary tissue products are made from multiple-plies of fibrous structures such that the facing-out surfaces are identical, in which case it is only necessary to test one surface.

Each sample is folded upon itself to make a 4.5" CD×4" MD sample. For two-surface testing, make up 3 (4.5" CD×4" MD) samples with a first surface "out" and 3 (4.5" CD×4" MD) samples with the second surface "out". Keep track of which samples are first surface "out" and which are second surface "out".

For a dry lint test, obtain a 30"×40" piece of Crescent #300 cardboard from Cordage Inc. (800 E. Ross Road, Cincinnati, Ohio, 45217) or equivalent. Using a paper cutter, cut out six pieces of cardboard of dimensions of 6.35 cm×15.24 cm (2.5 inch×6 inch). Puncture two holes into each of the six pieces of cardboard by forcing the cardboard onto the hold down pins of the Sutherland Rub tester. Center and carefully place each of the cardboard pieces on top of the previously folded samples with the tested side exposed outward. Make sure the 15.24 cm (6 inch) dimension of the cardboard is running parallel to the machine direction (MD) of each of the folded samples. Fold one edge of the exposed portion of the sample onto the back of the cardboard. Secure this edge to the cardboard with adhesive tape obtained from 3M Inc. (¾" wide Scotch Brand, St. Paul, Minn.) or equivalent. Carefully grasp the other over-hanging tissue edge and snugly fold it over onto the back of the cardboard. While maintaining a snug fit of the sample onto the cardboard, tape this second edge to the back of the cardboard. Repeat this procedure for each sample. Turn over each sample and tape the cross direction edges of the sample to the cardboard. One half of the adhesive tape should contact the sample while the other half is adhering to the cardboard. Repeat this procedure for each of the samples. If the sample breaks, tears, or becomes frayed at any time during the course of this sample preparation procedure, discard and make up a new sample with a sample strip.

ii. Felt and Weight Component Preparation—

Cut a piece of a black test felt (F-55 or equivalent from New England Gasket, 550 Broad Street, Bristol, Conn. 06010) to the dimensions of 2¼"×7¼". The felt is to be used in association with a weight. The weight may include a clamping device to attach the felt/cardboard combination to the weight. The weight and any clamping device total five (5) pounds. The weight is available from Danilee Company, San Antonio, Tex., and is associated with the Sutherland Rub Tester. The weight has a 2"×4" piece of smooth surface foam attached to its contact face (⅛" thick, Poron quick Recovery Foam, adhesive back, firmness rating 13). For the dry test, the felt is clamped directly against this foam surface, providing an effective contact area of 8 in$^2$ and a contact pressure of about 0.625 psi. For the wet test, an additional 1"×4" foam strip (same foam as described above) is attached and centered in the length direction on top the 2"×4" foam strip, thus, after clamping the felt against this surface, an effective contact area of 4 in$^2$ and a contact pressure of about 1.25 psi is established. Also, for the wet test only, after clamping the felt to weight apparatus, two strips of tape (4¼"-5¼" in length, Scotch brand ¾" width) are placed along each edge of the felt (parallel to the long side of the felt) on the felt side that will be contacting the sample. The untaped felt between the two tape strips has a width between 18-21 mm. Three marks are placed on one of the strips of tape at 0, 4 and 10 centimeters along the flat, test region of the test felt.

iii. Conducting Dry Lint Test—

The amount of dry lint and/or dry pills generated from a fibrous product according to the present invention is determined with a Sutherland Rub Tester (available from Danilee Company, San Antonio, Tex.). This tester uses a motor to rub a felt/weight component 5 times (back and forth) over the fibrous product, while the fibrous product is restrained in a stationary position.

First, turn on the Sutherland Rub Tester pressing the "reset" button. Set the tester to run 5 strokes at the lower of the two speeds. One stroke is a single and complete forward and reverse motion of the weight. The end of the rubbing block should be in the position closest to the operator at the beginning and at the end of each test.

Place the sample/cardboard combination on the base plate of the tester by slipping the holes in the board over the hold-down pins. The hold-down pins prevent the sample from moving during the test. Hook the felt/weight combination into the tester arm of the Sutherland Rub Tester, and gently place it on top of the sample/cardboard combination. The felt must rest level on the calibration sample and must be in 100% contact with the calibration sample surface (use a bubble level indicator to verify). Activate the Sutherland Rub Tester by pressing the "start" button.

Keep a count of the number of strokes and observe and make a mental note of the starting and stopping position of the felt covered weight in relationship to the sample. If the total number of strokes is five and if the position of the calibration felt covered weight is the same at the end as it was in the beginning of the test, the test was successful performed. If the total number of strokes is not five or if the start and end positions of the felt covered weight are different, then the instrument may require servicing and/or recalibration.

Once the instrument is finished moving, remove the felt covered weight from the holding arm of the instrument, and unclamp the felt from the weight. Lay the test felt on a clean, flat surface.

The next step is to complete image capture, analysis, and calculations on the test felts as described below.

vi. Image Capture—

The images of the felt (untested), sample (untested) and felt (tested) are captured using a computer and scanner (Microtek ArtixScan 1800f. Be certain that scanner glass is clear and clean. Place felts centered on scanner, face down. Adjust image capture boundaries so that all felts are included into the captured image. Set-up the scanner to 600 dpi, RGB, and 100% image size (no scaling). After successfully imaging the felts, save the image as an 8-bit RGB TIFF image, remove felts from scanner, and repeat from process until all felts images are captured.

Additional images of the sample (untested) may need to be captured (in the same manner) if they have an average luminance (using Optimas software) significantly less than 254 (less than 244), after being converted to an 8-bit gray-scale image. Also, an image of a known length standard (e.g., a ruler) is taken (exposure difference does not matter for this image). This image is used to calibrate the image analysis software distance scale.

vii. Image Analysis—

The images captured are analyzed using Optimas 6.5 Image Analysis software commercially available from Media Cybernetics, L.P. Imaging set-up parameters, as listed herein, must be strictly adhered to in order to have meaningfully comparative lint score and pill score results.

First, an image with a known length standard (e.g., a ruler) is brought up in Optimas, and used to calibrate length units (millimeters in this case). For dry testing, the region of interest (ROI) area is approximately 4500 mm2 (90 mm by 50 mm), and the wetted and dragged ROI area is approximately 1500 mm2 (94 mm by 16 mm). The exact ROI area is measured and recorded (variable name: ROI area). The average gray value of the unrubbed region of the test felt is used as the baseline, and is recorded for determining the threshold and lint values (variable name: untested felt GV avg). It is determined by creating a region of interest box (ROI) with dimensions approximately 5 mm by 25 mm on the untested, unrubbed area of the black felt, on opposite ends of the rubbed region. The average of these two average gray value luminaces for each of the ROI's is used as the untested felt GV average value for that particular test felt. This is repeated for all test felts analyzed. The test sheet luminance is typically near saturated white (gray value 254) and fairly constant for samples of interest. If believed to be different, measure the test sheet in a similar fashion as was done for the untested felt, and record (variable name=untested sheet GV avg). The luminance threshold is calculated based on the untested felt GV avg and untested sheet GV avg as follows:

For the dry lint/pilling test felts:

(untested_sheet_GV_avg−untested_felt_GV_avg)* 0.4+untested_felt_GV_avg

For the wet lint/pilling test felts:

(untested_sheet_GV_avg−untested_felt_GV_avg)* 0.25+untested_felt_GV_avg

The test felt image is opened, and the ROI and its boundaries are created and properly positioned to encompass a region that completely contains pills and contains the highest concentration of pills on the rubbed section of the test felt. The average luminance for the ROI is recorded (variable name: ROI GV avg). Pills are determined as follows: Optimas creates boundary lines in the image where pixel luminance values cross through the threshold value (e.g., if the threshold is 120, boundary lines are created where pixels of higher and lower value exist on either side. The criteria for determining a pill is that it must have an average luminance greater than the threshold value, and have a perimeter length greater than 0.5 mm. The sum of the pilled areas variable name is: Total Pilled Area.

Measurement data of the ROI, and for each pill is exported from Optimas to a spreadsheet for performing the following calculations.

viii. Calculations—

The data obtained from the image analysis is used in the following calculations:

Pilled Area %=Percent of area covered by pilling=Total Pilled Area/ROI area

Lint Score=Gray value difference between unpilled area of the rubbed test felt area and the untested felt Lint Score=unpilled felt Gray Value avg−untested felt Gray Value avg where: unpilled felt Gray Value avg=[(ROI Gray Value avg*ROI area)−(pilled Gray Value avg*pilled area)]/Total Unpilled Area By taking the average of the lint score of the first-side surface and the second-side surface, the lint is obtained which is applicable to that particular web or product. In other words, to calculate lint score, the following formula is used:

$$\text{Dry Lint Score} = \frac{\text{Dry Lint Score}, 1^{st} \text{ side} + \text{Dry Lint Score}, 2^{nd} \text{ side}}{2}$$

$$\text{Dry Pill Area \%} = \frac{\text{Dry Pill Area \%}, 1^{st} \text{ side} + \text{Dry Pill Area \%}, 2^{nd} \text{ side}}{2}$$

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multi-ply fibrous structure comprising:
1) a first ply comprising a layered fibrous structure comprising:
   a. a first layer comprising a plurality of first filaments comprising a first hydroxyl polymer comprising a polysaccharide;
   b. a second layer comprising a plurality of second filaments comprising a second hydroxyl polymer comprising a non-polysaccharide; and
   c. a first web material comprising a first wet laid fibrous structure, wherein the plurality of first filaments of the first layer are deposited directly onto the first wet laid fibrous structure and are positioned between the first wet laid fibrous structure and the second layer; and
2) a second ply comprising a second wet laid fibrous structure wherein the first wet laid fibrous structure of the first ply is bonded to the second wet laid fibrous structure of the second ply.

2. The multi-ply fibrous structure according to claim 1 wherein the polysaccharide is selected from the group consisting of: cellulose, cellulose derivatives, starch, starch derivatives, hemicelluloses, hemicelluloses derivatives, and mixtures thereof.

3. The multi-ply fibrous structure according to claim 1 wherein the non-polysaccharide is a polyvinyl alcohol.

4. The multi-ply fibrous structure according to claim 1 wherein at least one of the first filaments exhibits an Elongation at Rupture that is less than the Elongation at Rupture of at least one of the second filaments as measured according to the Elongation at Rupture Test Method.

5. The multi-ply fibrous structure according to claim 1 wherein at least one of the first filaments exhibits an Elongation at Rupture of less than 40% as measured according to the Elongation at Rupture Test Method.

6. The multi-ply fibrous structure according to claim 1 wherein at least one of the second filaments exhibits an Elongation at Rupture of greater than 20% as measured according to the Elongation at Rupture Test Method.

7. The multi-ply fibrous structure according to claim 1 wherein the second layer is bonded to the first layer at a bond spacing of greater than 0.05 inches.

8. The multi-ply fibrous structure according to claim 1 wherein the first layer exhibits a basis weight of greater than 2 gsm.

9. The multi-ply fibrous structure according to claim 1 wherein the second layer exhibits a basis weight of at least 0.1 gsm.

10. The multi-ply fibrous structure according to claim 1 wherein the second layer exhibits a basis weight of from about 0.1 gsm to about 5 gsm.

11. The multi-ply fibrous structure according to claim 1 wherein the second layer exhibits a basis weight of at least 0.5 gsm and the second filaments comprise a polyvinyl alcohol that exhibits a weight average molecular weight of greater than 25,000 g/mol and exhibit a hydrolysis of greater than 95%.

12. The multi-ply fibrous structure according to claim 1 wherein the second layer exhibits a basis weight of at least 0.15 gsm and the second filaments comprise a polyvinyl alcohol that exhibits a weight average molecular weight of greater than 45,000 g/mol.

13. The multi-ply fibrous structure according to claim 1 wherein the first ply further comprises a third layer comprising a plurality of fibers.

14. The multi-ply fibrous structure according to claim 13 wherein the third layer exhibits a basis weight of greater than 10 gsm.

15. The multi-ply fibrous structure according to claim 1 wherein the first filaments exhibit an average diameter of greater than 0.5 μm to less than 20 μm as measured according to the Average Diameter Test Method.

16. The multi-ply fibrous structure according to claim 1 wherein the second filaments exhibit an average diameter of greater than 0.5 μm to less than 20 μm as measured according to the Average Diameter Test Method.

17. The multi-ply fibrous structure according to claim 1 wherein the multi-ply fibrous structure exhibits a Force Variability Value of less than 1.40 as measured according to the Glide on Skin Test Method.

18. The multi-ply fibrous structure according to claim 1 wherein the multi-ply fibrous structure exhibits a Force to Drag Value of less than 100 as measured according to the Glide on Skin Test Method.

* * * * *